(12) United States Patent
Costa et al.

(10) Patent No.: US 11,014,441 B2
(45) Date of Patent: May 25, 2021

(54) CLOSURE ASSEMBLY FOR FUEL-TANK FILLER NECK

(71) Applicant: STANT USA CORP., Connersville, IN (US)

(72) Inventors: Miguel Costa, Ostrava (CZ); Jan Nimrichter, Karvina (CZ); Paul C. Wetzel, Oxford, OH (US)

(73) Assignee: STANT USA CORP., Connersville, IN (US)

( * ) Notice: Subject to any disclaimer, the term of this patent is extended or adjusted under 35 U.S.C. 154(b) by 110 days.

(21) Appl. No.: 16/069,530

(22) PCT Filed: Jan. 13, 2017

(86) PCT No.: PCT/US2017/013446
§ 371 (c)(1),
(2) Date: Jul. 12, 2018

(87) PCT Pub. No.: WO2017/123950
PCT Pub. Date: Jul. 20, 2017

(65) Prior Publication Data
US 2019/0023125 A1    Jan. 24, 2019

Related U.S. Application Data

(60) Provisional application No. 62/280,529, filed on Jan. 19, 2016, provisional application No. 62/279,478, filed on Jan. 15, 2016.

(51) Int. Cl.
*B60K 15/04* (2006.01)
*B60K 15/03* (2006.01)
*B60K 15/05* (2006.01)

(52) U.S. Cl.
CPC .............. *B60K 15/04* (2013.01); *B60K 15/03* (2013.01); *B60K 15/05* (2013.01); *B60K 2015/03453* (2013.01); *B60K 2015/03467* (2013.01); *B60K 2015/047* (2013.01); *B60K 2015/048* (2013.01); *B60K 2015/0429* (2013.01); *B60K 2015/0461* (2013.01)

(58) Field of Classification Search
CPC .... B60K 2015/0429; B60K 2015/0432; B60K 2015/047
See application file for complete search history.

(56) References Cited

U.S. PATENT DOCUMENTS 3,418,991 A    12/1968  Shultz
2008/0129046 A1    6/2008  Parker et al.
(Continued)

FOREIGN PATENT DOCUMENTS

WO    2015/105626 A1    7/2015
WO    2015105627          7/2015

OTHER PUBLICATIONS

PCT Search Report and Written Opinion completed on Mar. 7, 2017 and issued in connection with PCT/US2017/013446.
(Continued)

*Primary Examiner* — Mollie Impink
(74) *Attorney, Agent, or Firm* — Barnes & Thornburg LLP

(57) ABSTRACT

A fuel tank filler apparatus comprises a capless filler neck closure adapted to be mated with an outer end of a fuel-tank filler neck. The capless filler neck closure may be removable from the fuel-tank filler neck for service or repair.

6 Claims, 13 Drawing Sheets

(56) References Cited

U.S. PATENT DOCUMENTS

| | | | |
|---|---|---|---|
| 2012/0217240 A1 | 8/2012 | Dutzi et al. | |
| 2014/0084005 A1* | 3/2014 | Kito | B60K 15/04 220/304 |
| 2014/0319161 A1* | 10/2014 | Kito | B60K 15/04 220/820 |
| 2015/0001215 A1* | 1/2015 | Kito | B60K 15/04 220/86.2 |
| 2015/0083720 A1 | 3/2015 | Kobayashi et al. | |
| 2015/0151633 A1* | 6/2015 | Kito | B60K 15/04 137/527 |
| 2015/0343897 A1* | 12/2015 | Kito | B60K 15/04 220/86.1 |
| 2015/0343898 A1* | 12/2015 | Kito | B60K 15/04 220/86.1 |
| 2016/0361993 A1* | 12/2016 | Kito | B60K 15/04 |

OTHER PUBLICATIONS

Extended European Search Report, European Application No. 17739049.9-1012, dated Sep. 18, 2019, 8 pages.

International (PCT) Search Report and Written Opinion for PCT/US2017/013446, received Mar. 27, 2017, ST-415 PCT ||(6427-260765), 8 pages.

* cited by examiner

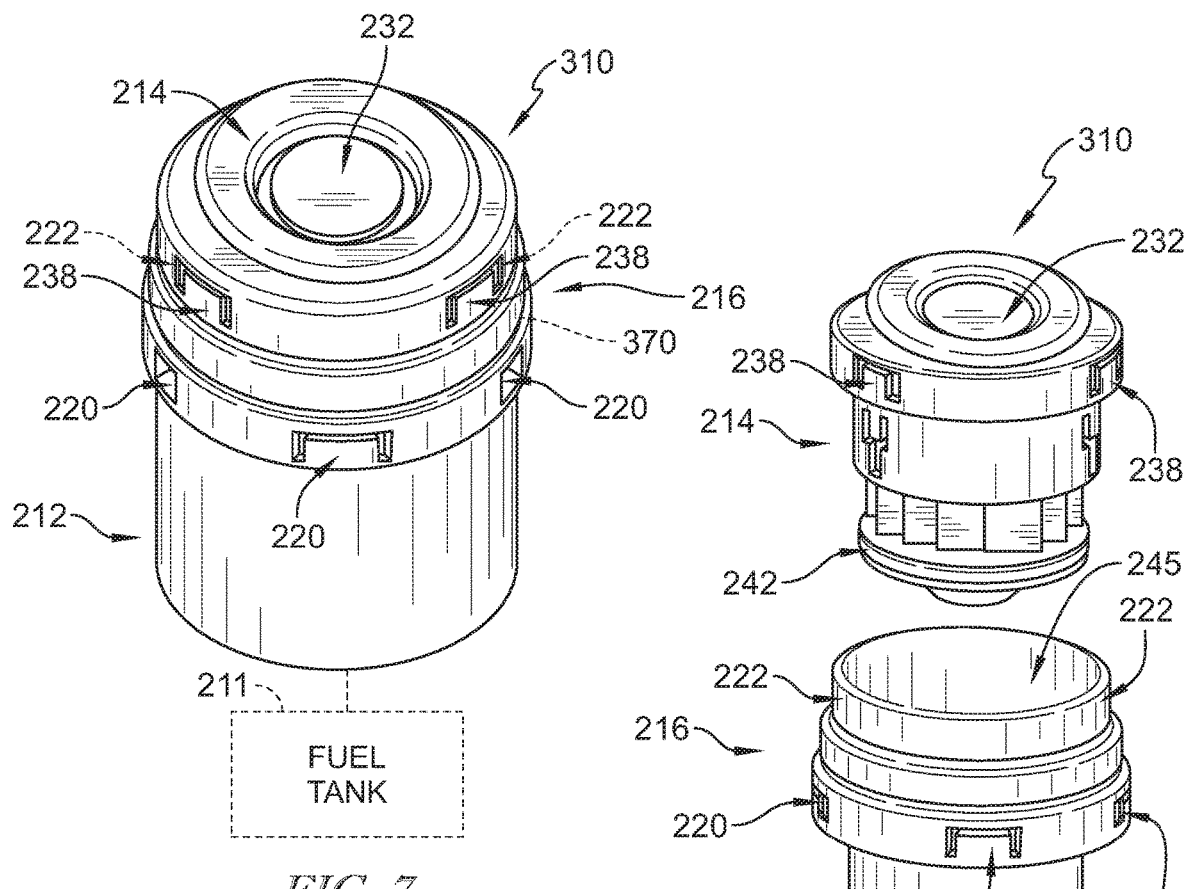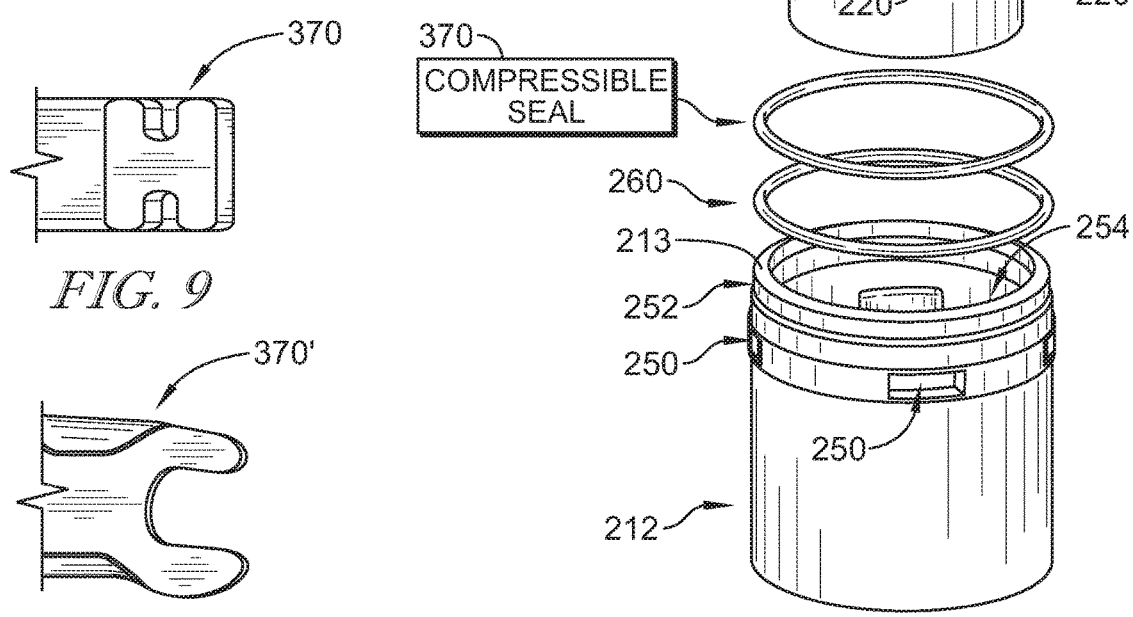

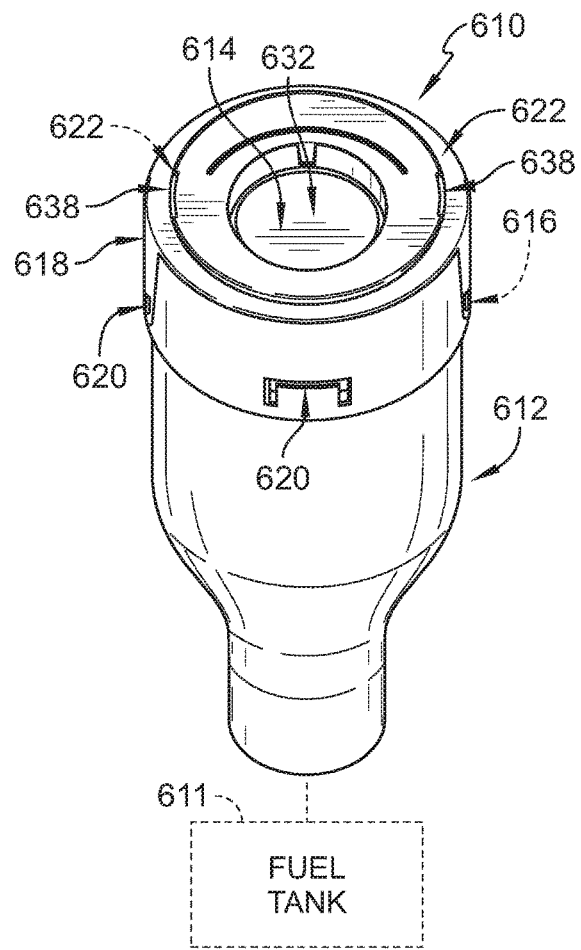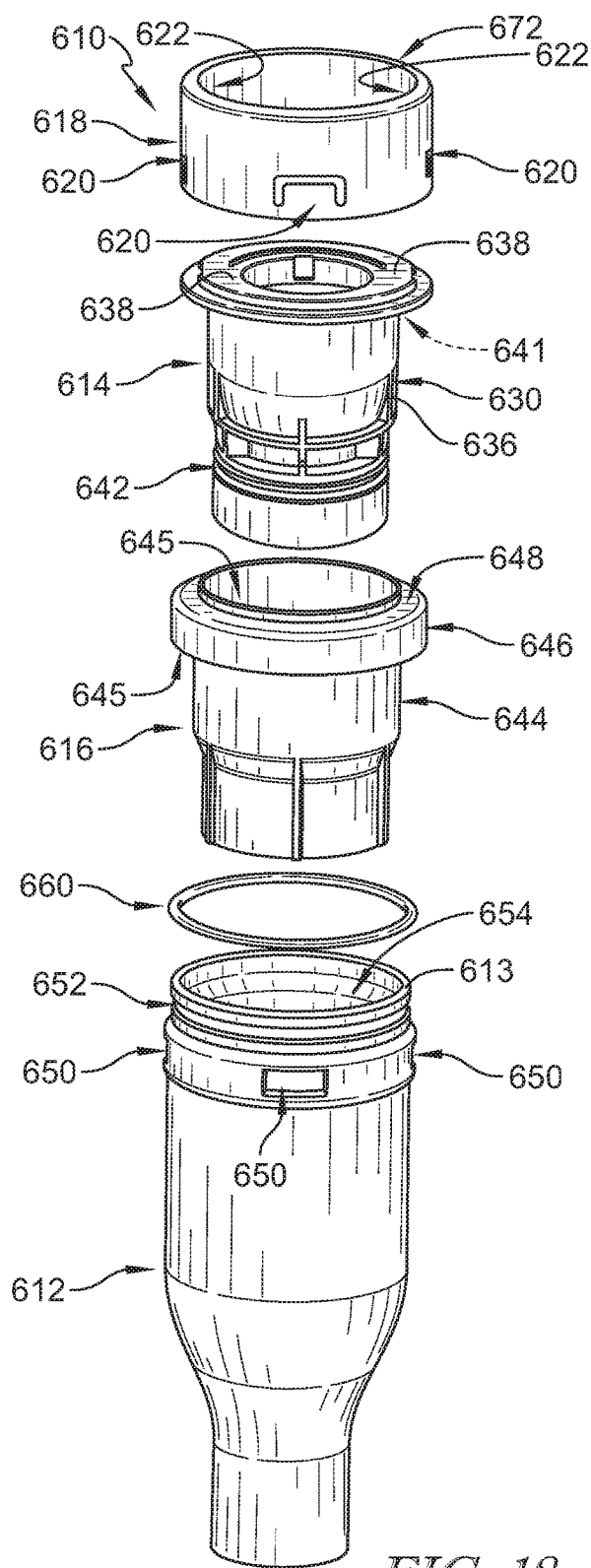
FIG. 17
FIG. 18

CLOSURE ASSEMBLY FOR FUEL-TANK FILLER NECK

CROSS-REFERENCE TO RELATED APPLICATIONS

This application is a U.S. national counterpart application of international application serial No. PCT/US2017/013446, filed Jan. 13, 2017, which claims priority to U.S. Provisional Application Ser. No. 62/279,478, filed Jan. 15, 2016 and to U.S. Provisional Application Ser. No. 62/280,529, filed Jan. 19, 2016, the disclosures of which are expressly incorporated by reference in their entireties.

BACKGROUND

The present disclosure relates to a closure assembly for a tank filler neck, and particularly to a capless closure assembly for a vehicle fuel tank that operates to close the filler neck automatically as soon as a fuel-dispensing pump nozzle is removed from the filler neck following refueling of the tank. More particularly, the present disclosure relates to systems for coupling a capless closure assembly to a fuel-tank filler neck.

SUMMARY

According to the present disclosure, a fuel tank filler apparatus adapted for use in a vehicle is configured to carry liquid fuel to an associated fuel tank during refueling. The fuel tank filler apparatus comprises a capless filler neck closure mated with an outer end of a fuel-tank filler neck. The capless filler neck closure closes the fuel-tank filler neck until a fuel nozzle is inserted for refueling the vehicle. The capless filler neck closure is removable from the fuel-tank filler neck for service or repair.

In illustrative embodiments, the fuel tank filler apparatus includes an interface sleeve that facilitates coupling of the capless filler neck closure to a blow-molded fuel-tank filler neck. The interface sleeve is shaped to push the fuel-tank filler neck into a round shape along a portion of the fuel-tank filler neck to facilitate sealing between the fuel-tank filler neck and the capless filler neck closure. The interface sleeve engages both the capless filler neck closure and the fuel-tank filler neck without welds or permanent attachment such that the capless filler neck closure is coupled removably from the filler neck to allow for service or replacement.

In some illustrative embodiments, the interface sleeve includes crimp tabs adapted to couple the interface sleeve to the fuel-tank filler neck. The crimp tabs are configured to be deformed into engagement with tab receivers formed in an outer surface of the fuel-tank filler neck.

In some embodiments, the interface sleeve includes catch receivers adapted to be engaged by inwardly or outwardly extending catches included in the capless filler neck closure. In illustrative embodiments, the interface sleeve includes catches that engage catch receivers formed in an outer surface of the fuel-tank filler neck.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a capless filler neck closure mounted on a fuel-tank filler neck to close off the fuel-tank filler neck when not being refueled, showing the closure coupled to the fuel-tank filler neck by an interface sleeve comprising metallic materials to provide a fuel tank filler apparatus in which the closure is removable from the filler neck for service or replacement;

FIG. 2 is an exploded perspective assembly of the fuel tank filler apparatus of FIG. 1 showing that the closure includes external catches adapted to engage internal catch receivers included in the interface sleeve to couple the closure to the interface sleeve, showing that the interface sleeve includes crimp tabs adapted to engage external tab receivers formed in the filler neck to couple the interface sleeve and the closure to the filler neck, and showing an o-ring seal included in the fuel-tank filler neck apparatus sized to be received in a groove formed in the outer surface of the filler neck to seal between the filler neck and the interface sleeve;

FIG. 3 is a cross sectional view of the fuel tank filler apparatus of FIG. 1 showing that the interface sleeve includes an inner wall that pushes surrounding portions of the fuel-tank filler neck into a round shape and that forms the catch receivers engaged by the external catches of the closure to couple the closure to the interface sleeve, an outer wall that includes the crimp tabs that are deformed to extend into the tab receivers of the filler neck to couple the interface sleeve and the closure to the filler neck, and a top wall that interconnects the inner wall and the outer wall to define a downwardly opening channel that receives a portion of the filler neck;

FIG. 4 is a perspective view of a second capless filler neck closure mounted on a fuel-tank filler neck to close off the fuel-tank filler neck when not being refueled, showing the closure coupled to the fuel-tank filler neck by an interface sleeve comprising metallic materials to provide a second fuel tank filler apparatus in which the closure is removable from the filler neck for service or replacement;

FIG. 5 is an exploded perspective assembly of the fuel tank filler apparatus of FIG. 4 showing that the closure includes internal catches adapted to engage external catch receivers included in the interface sleeve to couple the closure to the interface sleeve, showing that the interface sleeve includes crimp tabs adapted to engage external tab receivers formed in the filler neck to couple the interface sleeve and the closure to the filler neck, and showing an o-ring seal included in the fuel-tank filler neck apparatus sized to be received in a groove formed in the outer surface of the filler neck to seal between the filler neck and the interface sleeve;

FIG. 6 is a cross sectional view of the fuel tank filler apparatus of FIG. 4 showing that the interface sleeve includes an inner wall that pushes surrounding portions of the fuel-tank filler neck into a round shape, an outer wall that includes the crimp tabs that are deformed to extend into the tab receivers of the filler neck to couple the interface sleeve and the closure to the filler neck, and a top wall that interconnects the inner wall and the outer wall to define a downwardly opening channel that receives a portion of the filler neck, and showing that the top wall forms the catch receivers that is engaged by the internal catches of the closure to couple the closure to the interface sleeve;

FIG. 7 is a perspective view of a third capless filler neck closure mounted on a fuel-tank filler neck to close off the fuel-tank filler neck when not being refueled, showing the closure coupled to the fuel-tank filler neck by an interface sleeve comprising metallic materials to provide a third fuel tank filler apparatus in which the closure is removable from the filler neck for service or replacement;

FIG. 8 is an exploded perspective assembly of the fuel tank filler apparatus of FIG. 7 showing that the closure includes internal catches adapted to engage external catch receivers included in the interface sleeve to couple the closure to the interface sleeve, showing that the interface sleeve includes crimp tabs adapted to engage external tab receivers formed in the filler neck to couple the interface sleeve and the closure to the filler neck, showing an o-ring seal included in the fuel-tank filler neck apparatus sized to be received in a groove formed in the outer surface of the filler neck to seal between the filler neck and the interface sleeve; and showing a compression seal included in the fuel-tank filler neck arranged along a top surface of the filler neck to seal between the filler neck and the interface sleeve;

FIG. 9 is a cut-away view of a portion of the compression seal of FIG. 8 showing the cross sectional shape of the compression seal;

FIG. 9A is a cut-away view of a portion of an alternative compression seal adapted for use in place of the compression seal shown in FIGS. 8 and 9;

Figure 10:
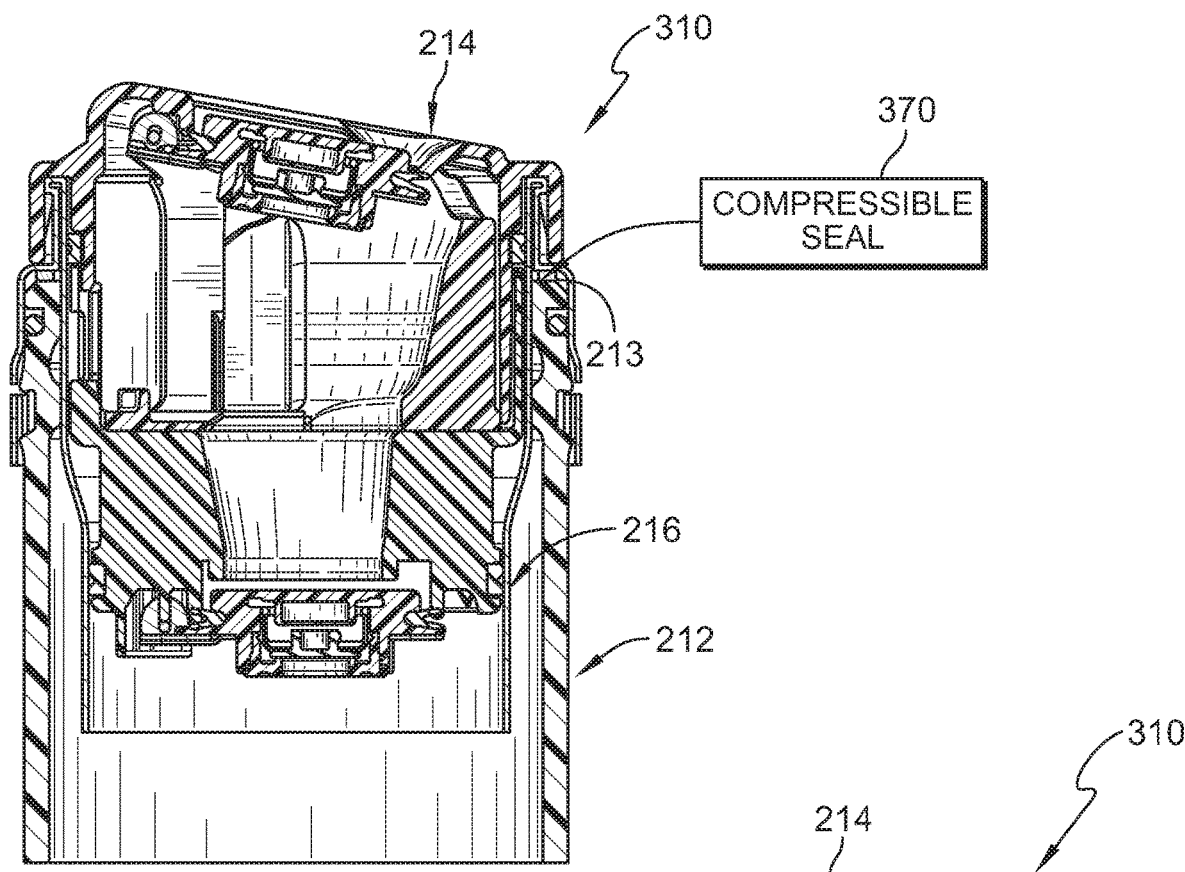
Figure 10A:
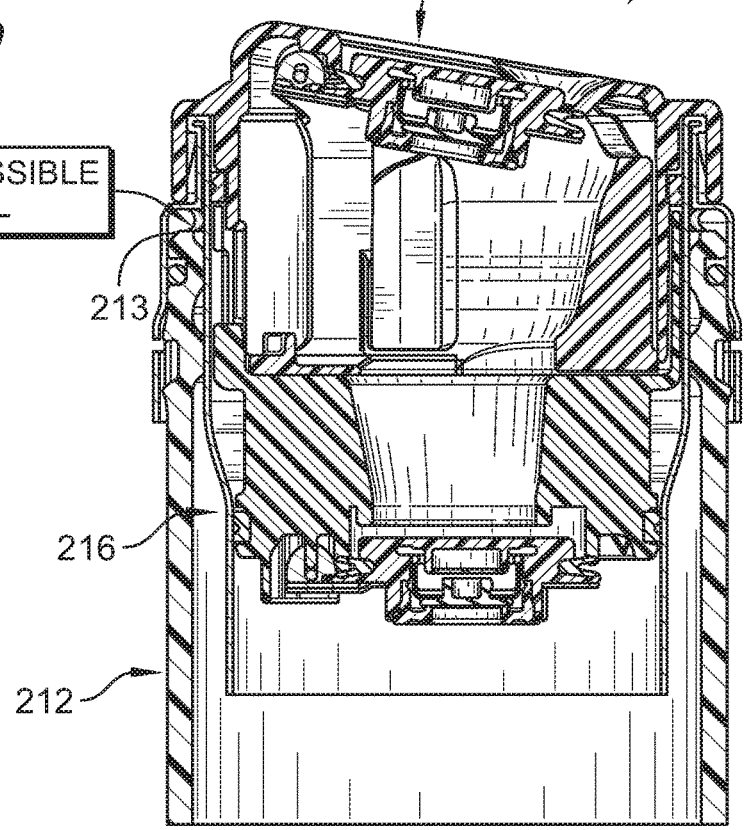
Figure 11:
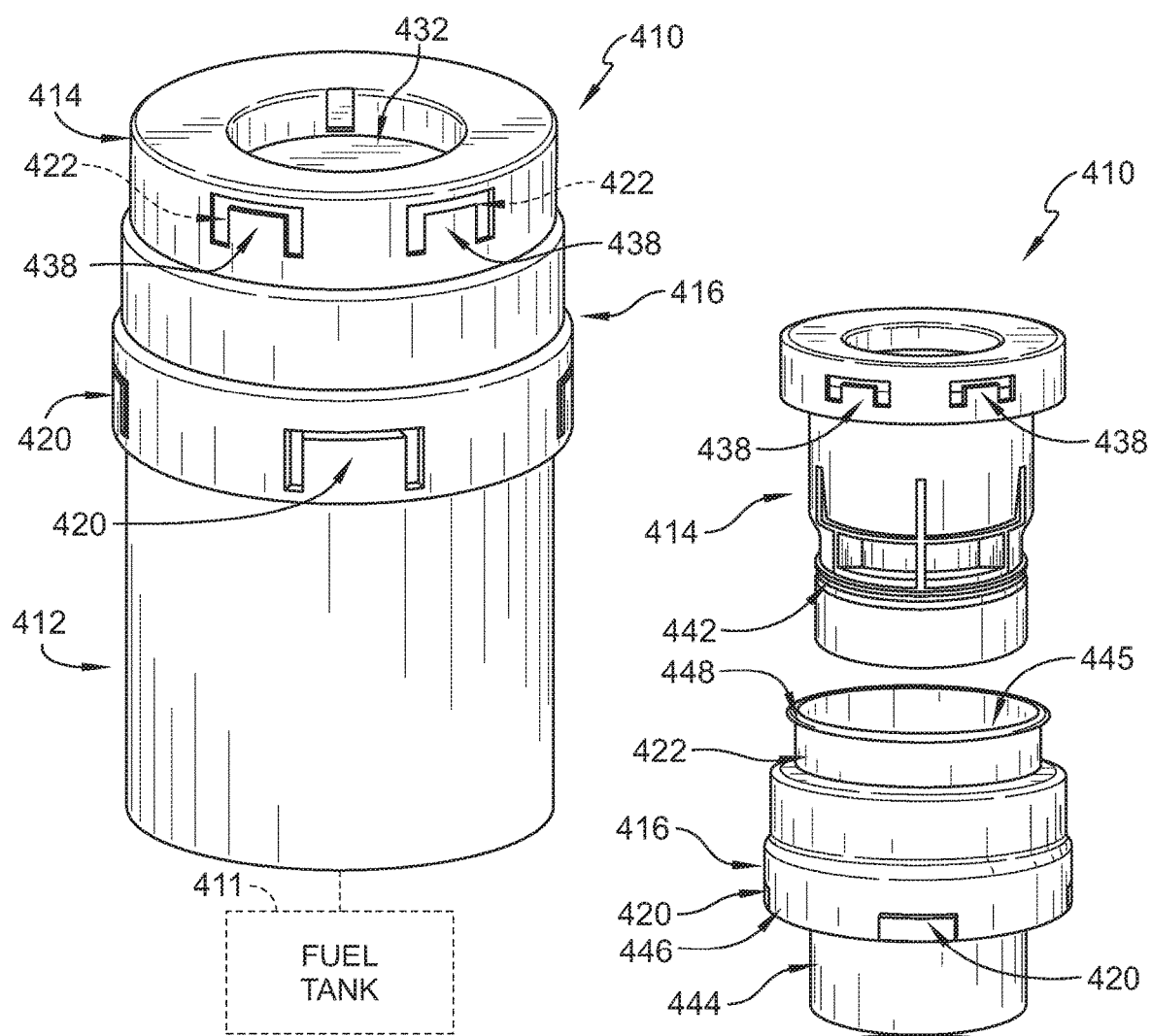
Figure 12:
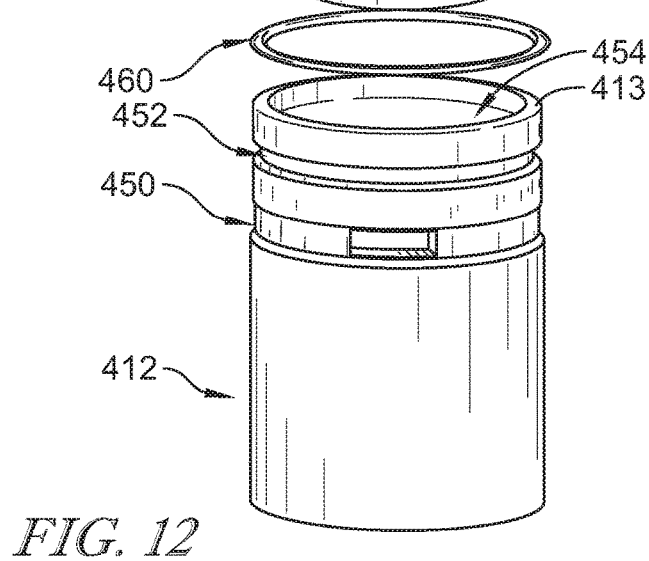
Figure 13:
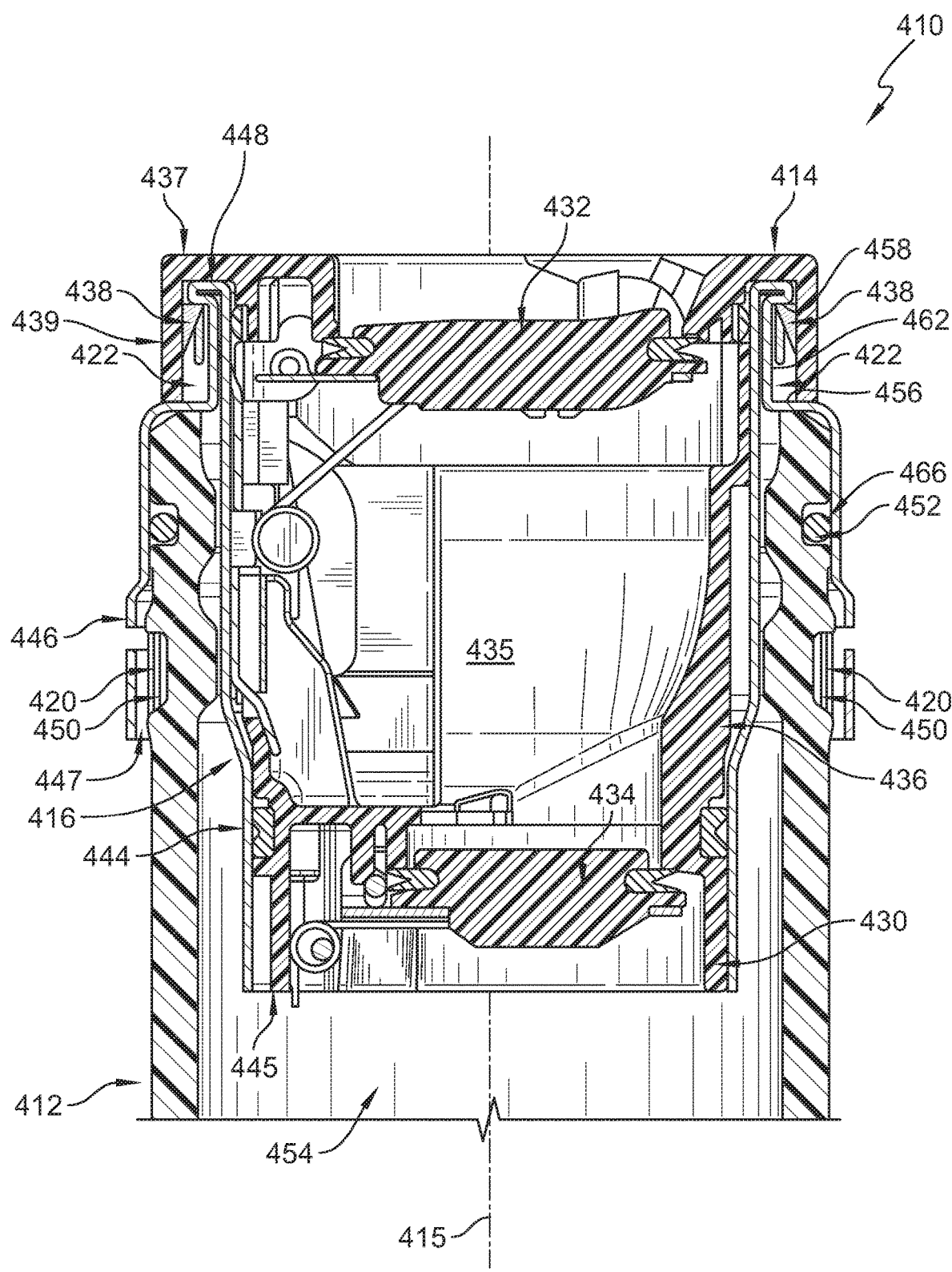
Figure 14:
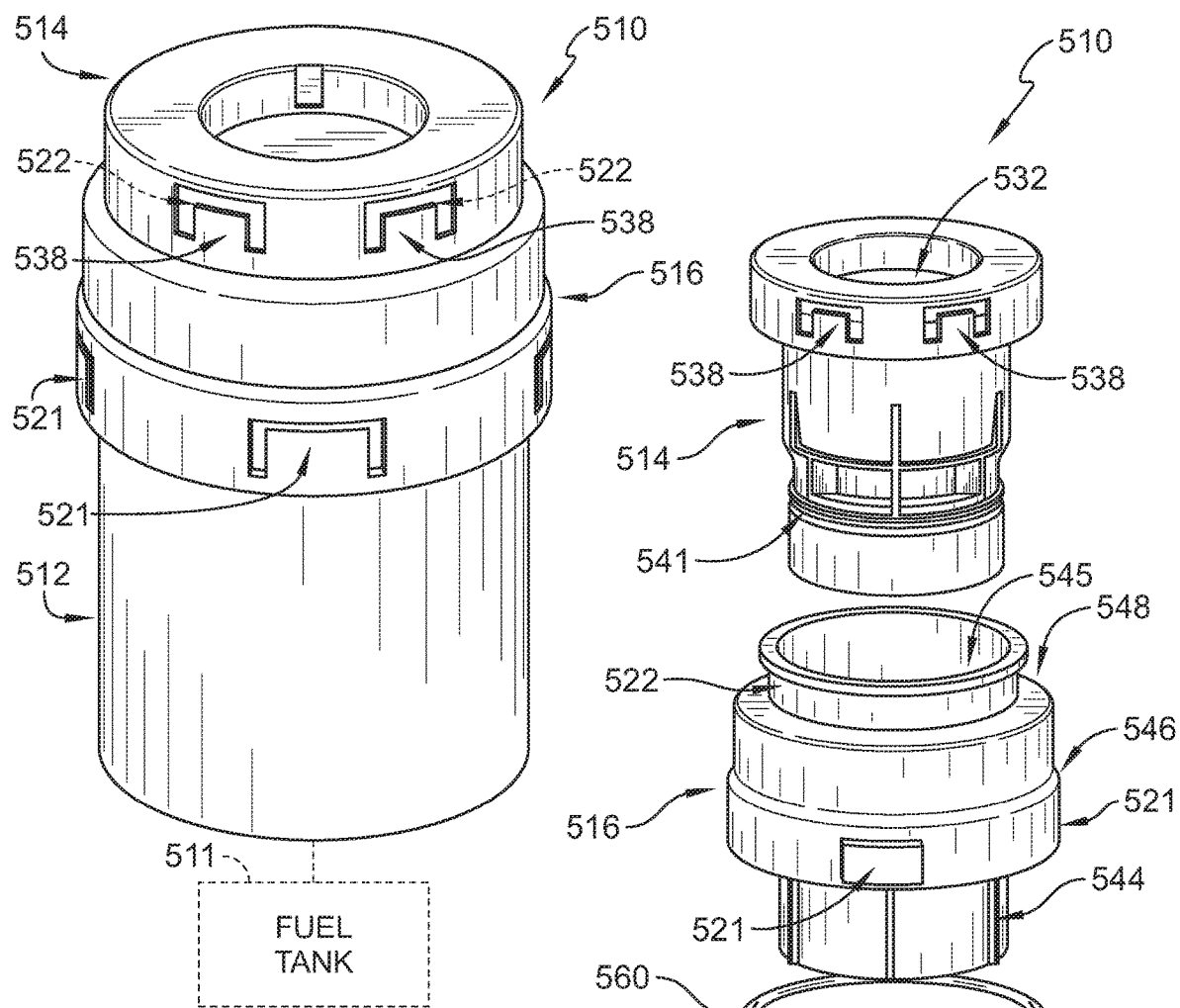
Figure 15:
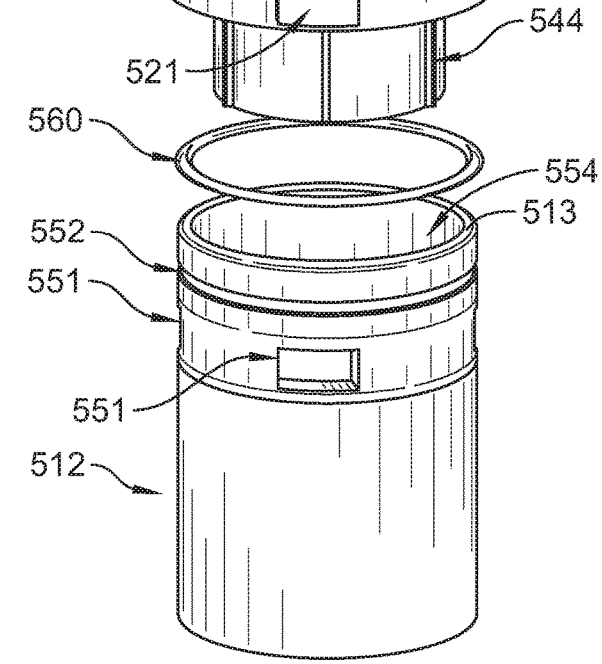
Figure 16:
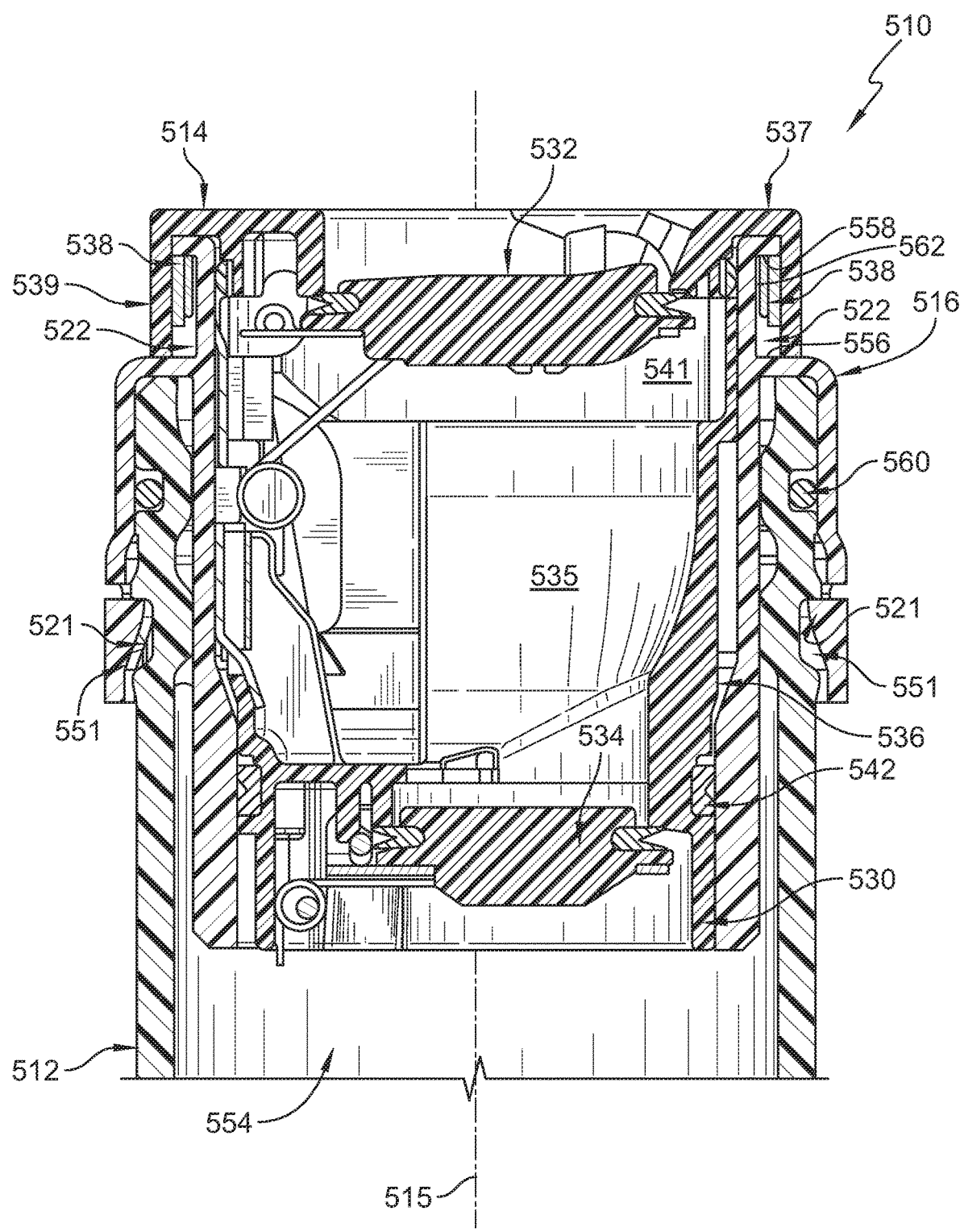
Figure 19:
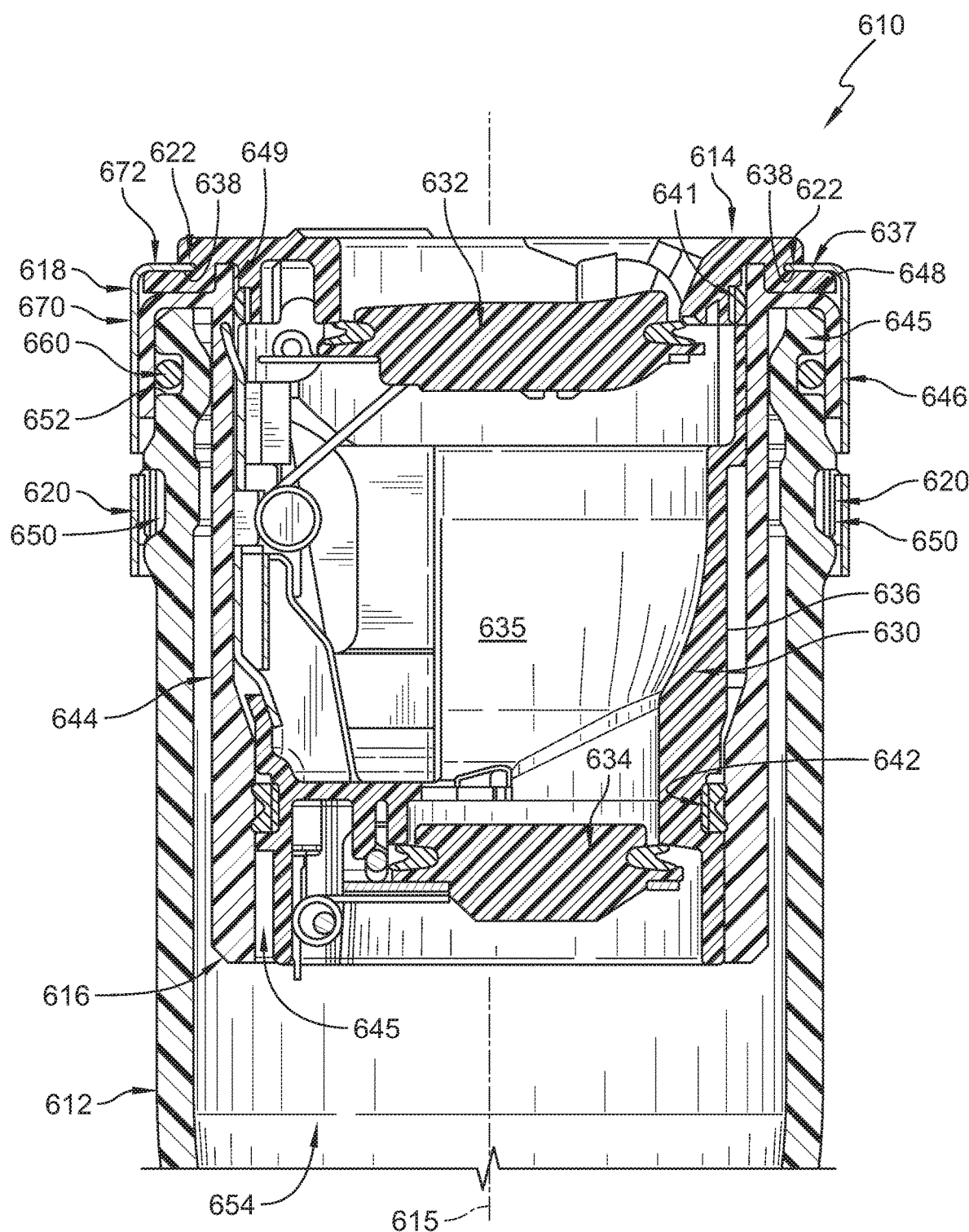
Figure 20:
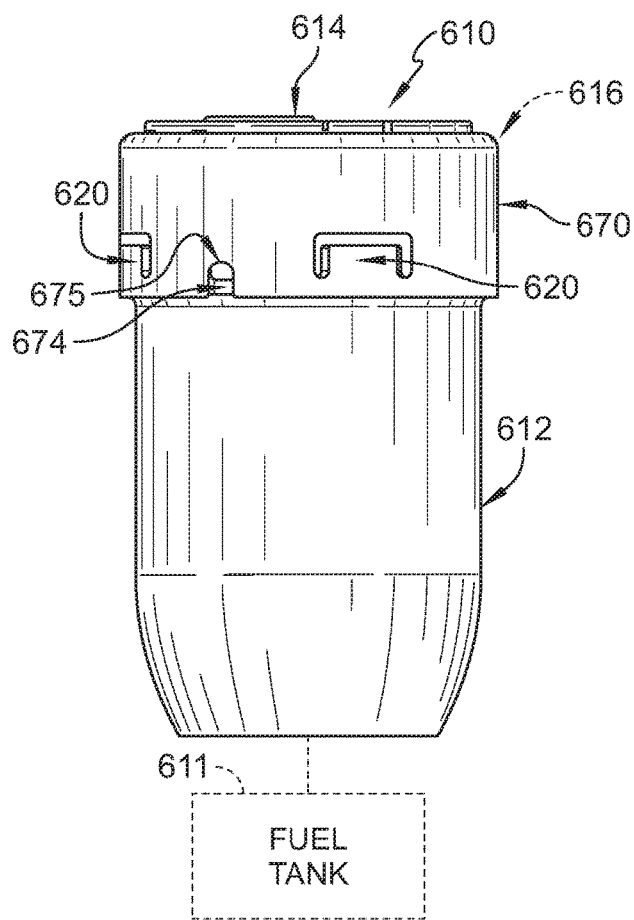
Figure 21:
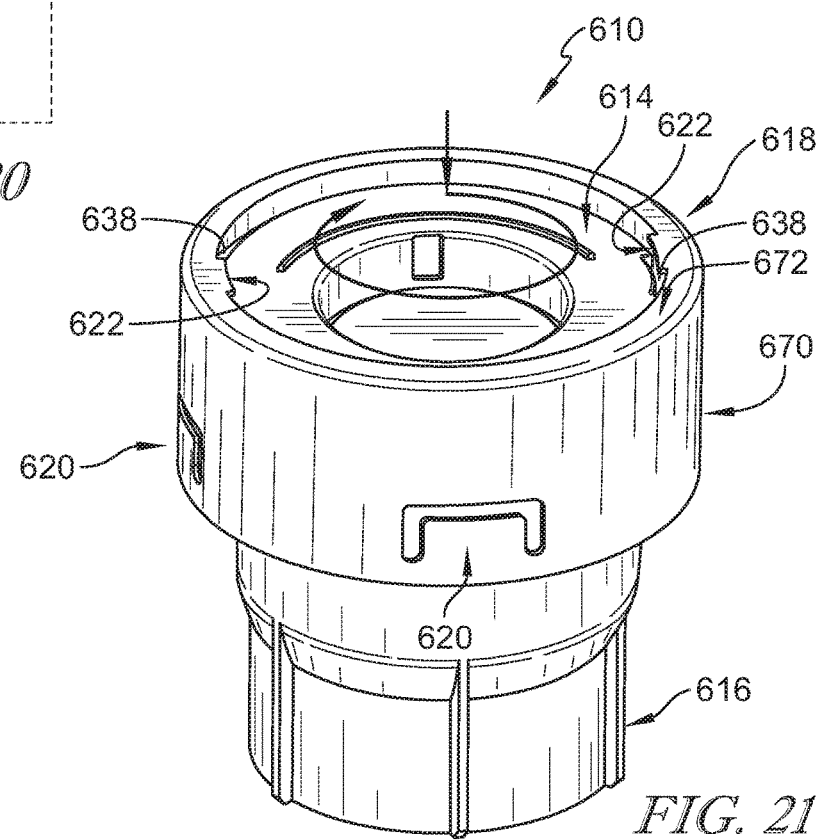

FIG. 10 is a cross sectional view of the fuel tank filler apparatus of FIG. 8 showing that the interface sleeve includes an inner wall that pushes surrounding portions of the fuel-tank filler neck into a round shape, an outer wall that includes the crimp tabs that are deformed to extend into the tab receivers of the filler neck to couple the interface sleeve and the closure to the filler neck, and a top wall that interconnects the inner wall and the outer wall, and showing that the top wall forms the catch receivers that is engaged by the internal catches of the closure to couple the closure to the interface sleeve and showing that the compressible seal is arranged between the top surface of the filler neck and the top wall of the interface sleeve;

FIG. 10A is a cross sectional view similar to FIG. 10 showing the alternative compression seal of FIG. 9A included in the fuel tank filler apparatus;

FIG. 11 a perspective view of a fourth capless filler neck closure mounted on a fuel-tank filler neck to close off the fuel-tank filler neck when not being refueled, showing the closure coupled to the fuel-tank filler neck by an interface sleeve comprising metallic materials to provide a fourth fuel tank filler apparatus in which the closure is removable from the filler neck for service or replacement;

FIG. 12 is an exploded perspective assembly of the fuel tank filler apparatus of FIG. 11 showing that the closure includes internal catches adapted to engage external catch receivers included in the interface sleeve to couple the closure to the interface sleeve, showing that the interface sleeve includes crimp tabs adapted to engage external tab receivers formed in the filler neck to couple the interface sleeve and the closure to the filler neck, and showing an o-ring seal included in the fuel-tank filler neck apparatus sized to be received in a groove formed in the outer surface of the filler neck to seal between the filler neck and the interface sleeve;

FIG. 13 is a cross sectional view of the fuel tank filler apparatus of FIG. 11 showing that the interface sleeve includes an inner wall that pushes surrounding portions of the fuel-tank filler neck into a round shape, an outer wall that includes the crimp tabs that are deformed to extend into the tab receivers of the filler neck to couple the interface sleeve and the closure to the filler neck, and a top wall that interconnects the inner wall and the outer wall to define a downwardly opening channel that receives the filler neck and that forms the catch receivers that is engaged by the internal catches of the closure to couple the closure to the interface;

FIG. 14 a perspective view of a fifth capless filler neck closure mounted on a fuel-tank filler neck to close off the fuel-tank filler neck when not being refueled, showing the closure coupled to the fuel-tank filler neck by an interface sleeve comprising polymeric materials to provide a fifth fuel tank filler apparatus in which the closure is removable from the filler neck for service or replacement;

FIG. 15 is an exploded perspective assembly of the fuel tank filler apparatus of FIG. 14 showing that the closure includes internal catches adapted to engage external catch receivers included in the interface sleeve to couple the closure to the interface sleeve, showing that the interface sleeve includes internal catches adapted to engage external tab receivers formed in the filler neck to couple the interface sleeve and the closure to the filler neck, and showing an o-ring seal included in the fuel-tank filler neck apparatus sized to be received in a groove formed in the outer surface of the filler neck to seal between the filler neck and the interface sleeve;

FIG. 16 is a cross sectional view of the fuel tank filler apparatus of FIG. 14 showing that the interface sleeve includes an inner wall that pushes surrounding portions of the fuel-tank filler neck into a round shape and that forms the catch receivers engaged by the internal catches of the closure to couple the closure to the interface, an outer wall that includes the catches that are extend into the tab receivers of the filler neck to couple the interface sleeve and the closure to the filler neck, and a top wall that interconnects the inner wall and the outer wall to define a downwardly opening channel that receives a portion of the filler neck;

FIG. 17 is a perspective view of a sixth capless filler neck closure mounted on a fuel-tank filler neck to close off the fuel-tank filler neck when not being refueled, showing the closure coupled to the fuel-tank filler neck by an interface sleeve and a retainer ring to provide a fuel tank filler apparatus in which the closure is removable from the filler neck for service or replacement;

FIG. 18 is an exploded perspective assembly of the fuel tank filler apparatus of FIG. 17 showing that the retainer ring includes crimp tabs adapted to engage external tab receivers formed in the filler neck to couple the capless filler neck closure to the fuel-tank filler neck and showing an o-ring seal included in the fuel-tank filler neck apparatus sized to be received in a groove formed in the outer surface of the filler neck to seal between the filler neck and the interface sleeve;

FIG. 19 is a cross sectional view of the fuel tank filler apparatus of FIG. 17 showing that the interface sleeve includes an inner wall that engages an inner diameter of the fuel-tank filler neck, an outer wall that engages an outer diameter of the fuel-tank filler neck, and a top wall that interconnects the inner wall and the outer wall to define a downwardly opening channel that receives a portion of the filler neck;

FIG. 20 is a side elevation view of the fuel tank filler apparatus of FIG. 17 showing that an outer band of the retainer ring is formed to include side slots that receive guide pegs included in the fuel-tank filler neck to orient the retainer ring and capless filler neck closure relative to the fuel-tank filler neck; and FIG. 21 is a perspective view of the capless filler neck closure, interface sleeve, and retainer ring of the fuel tank filler apparatus of FIG. 17 with arrows suggesting that the retainer ring is pushed down onto the capless filler neck closure and turned relative to the capless filler neck closure so that the cam tabs of the retainer ring engage the cam slots formed by the capless filler neck closure coupling the retainer ring to the capless filler neck closure.

DETAILED DESCRIPTION

Figure 1:
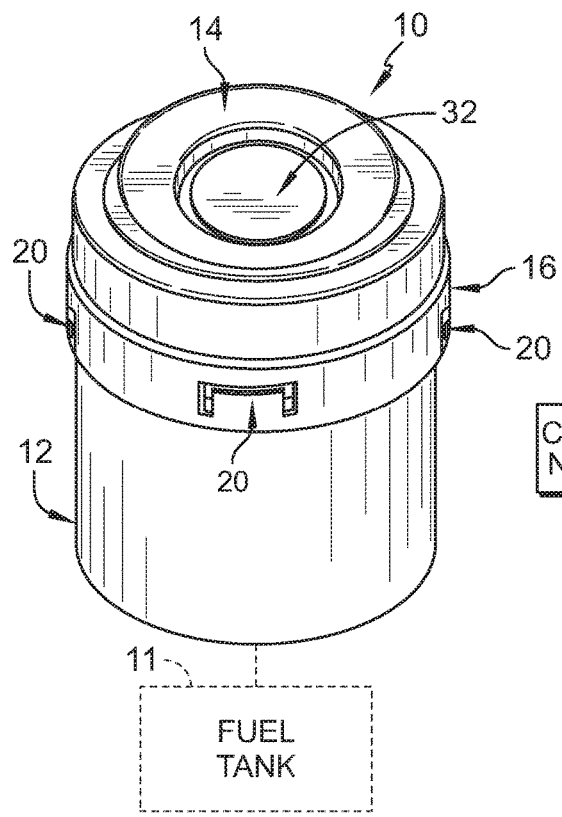
Figure 2:
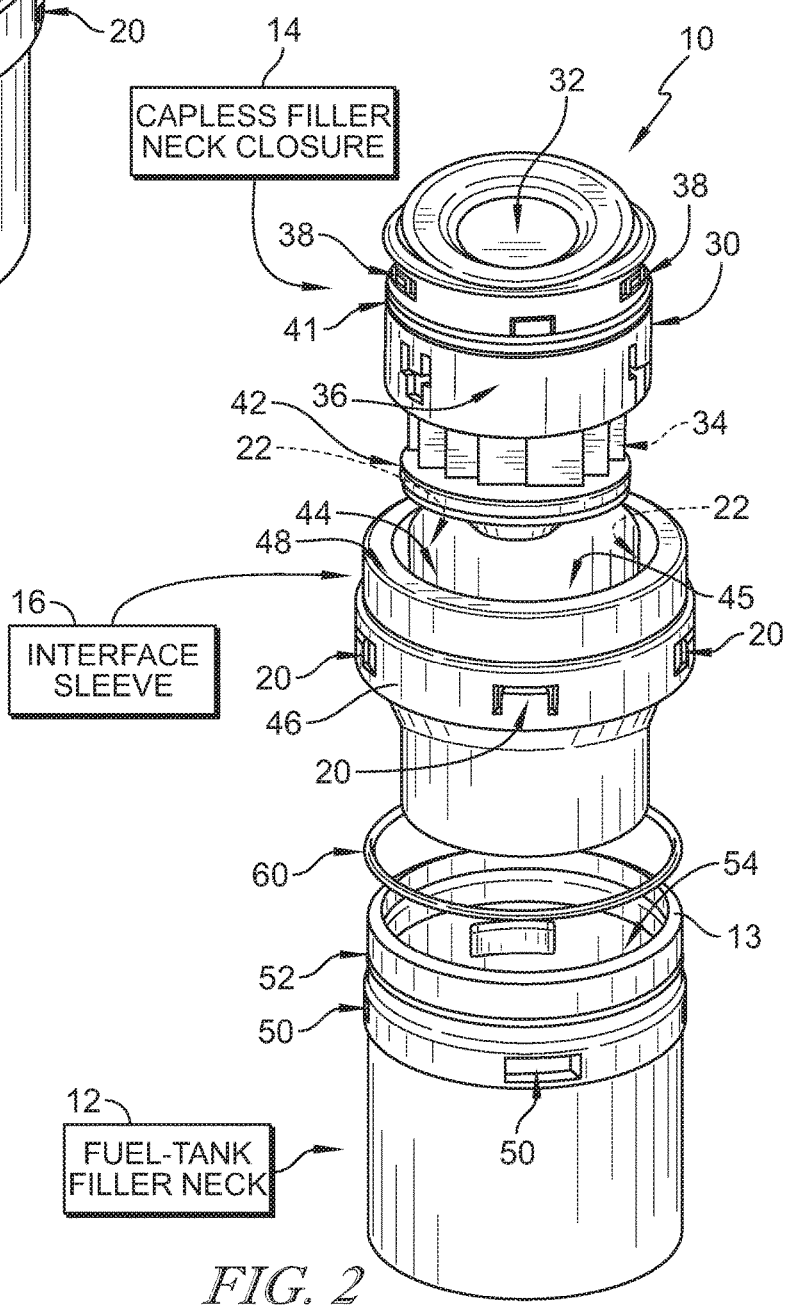
Figure 3:
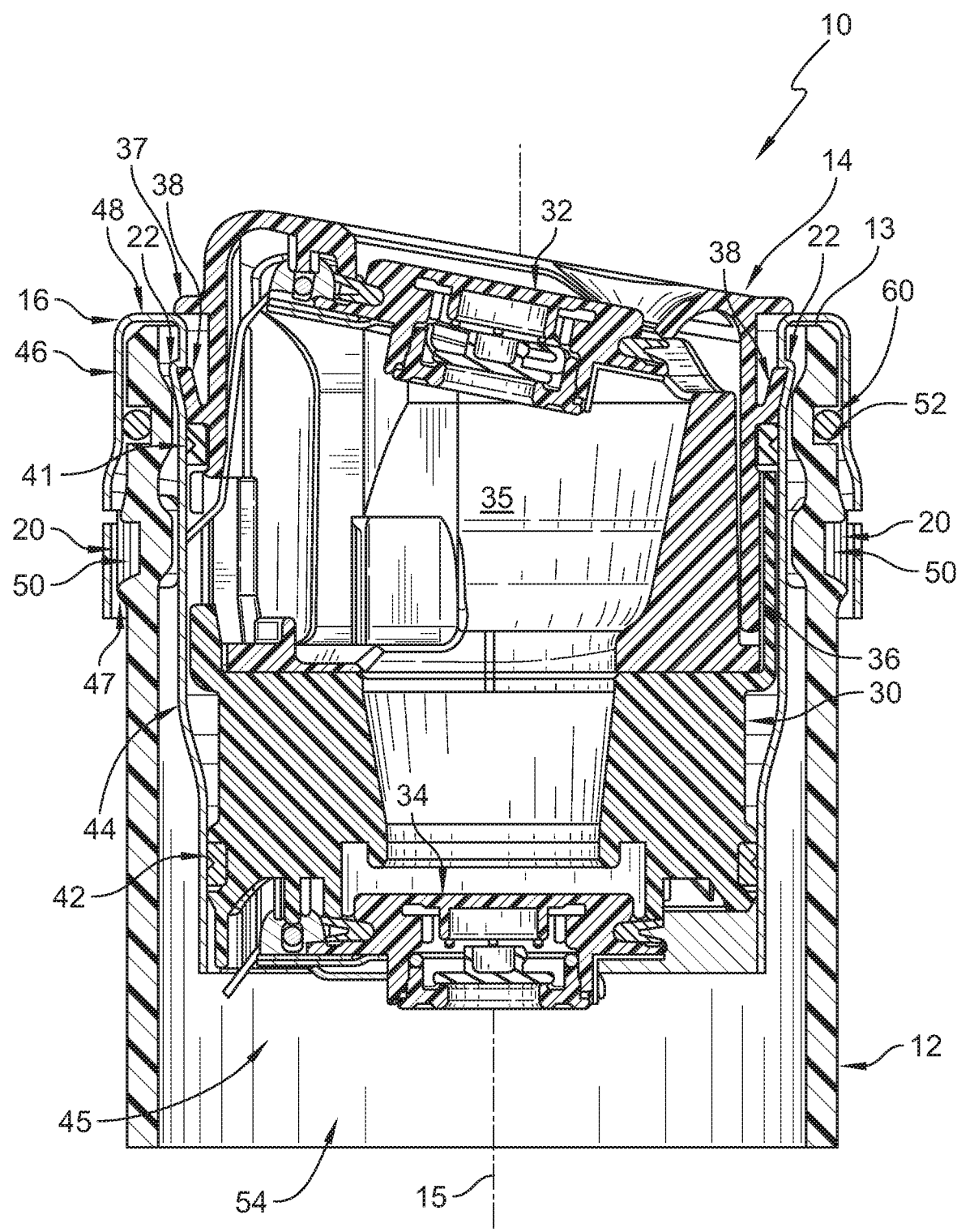

A first fuel tank filler apparatus 10 in accordance with the present disclosure includes a fuel-tank filler neck 12 associated with a fuel tank 11, a capless filler neck closure 14, and an interface sleeve 16 as shown in FIGS. 1-3. Interface sleeve 16 is shaped to push a portion of filler neck 12 into a round shape where closure 14 is inserted into filler neck 12 to facilitate sealing between filler neck 12 and closure 14. Interface sleeve 16 is adapted to couple closure 14 to filler neck 12 such that closure 14 is removable from filler neck 12 for service or replacement.

Closure 14 is not welded permanently to filler neck 12 when coupled to filler neck 12 by interface sleeve 16 and is removable by service technicians for service. Interface sleeve 16 includes crimp tabs 20 configured to engage filler neck 12 and a catch receivers 22 adapted to be engaged by catches 38 included in closure 14 in order to interconnect filler neck 12 and closure 14. In one illustrative method of using designs of the present disclosure, a technician would uncramp crimp tabs 20 of interface sleeve 16 such that crimp tabs 20 are disengaged from filler neck 12 before lifting closure 14 and interface sleeve 16 out of filler neck 12. The technician could then service closure 14 outside of filler neck 12. The technician may replace interface sleeve 16 as part of servicing closure 14 or may leave interface sleeve 16 in place during service. When service of closure 14 is complete, the technician could reinsert closure 14 and interface sleeve 16 into filler neck 12 and deform crimp tabs 20 to re-couple closure 14 to filler neck 12.

According to the present disclosure, capless filler neck closure 14 is adapted to close filler neck 12 to block fuel and fuel vapor from escaping fuel tank 11 through filler neck 12 when fuel tank 11 is not being refueled as suggested in FIG. 1. Closure 14 illustratively includes a nozzle-insertion housing 30 that is sized to extend into fuel-tank filler neck 12, an outer dust cover 32 mounted to housing 30, and an inner closure door 34 mounted to housing 30. Nozzle-insertion housing 30 forms a nozzle-insertion passageway 35 sized to receive a fuel-dispensing nozzle that extends through passageway 35 into filler neck 12 during refueling. Outer dust cover 32 and inner closure door 34 are mounted to pivot relative housing 30 when a fuel-dispensing nozzle is inserted into closure 14 for refueling.

Nozzle-insertion housing 30 of capless filler neck closure 14 is illustratively formed from polymeric materials and may be a multi-component assembly as shown in FIG. 3. Housing 30 of the exemplary embodiment includes an outer side wall 36 and catches 38 that extend outward in a radial direction from outer side wall 36 away from a central axis 15 of fuel tank filler apparatus 10. Seals 41, 42 are received in grooves formed in outer side wall 36 and engage interface sleeve 16 to seal between closure 14 and interface sleeve 16. Catches 38 engage catch receivers 22 of interface sleeve 16 to couple closure 14 to interface sleeve 16. Catches 38 are deformable and are angled to bend during insertion of closure 14 into interface sleeve 16.

Interface sleeve 16 illustratively is a monolithic, one-piece component that comprises metallic materials (i.e. stainless steel) as suggested in FIGS. 1-3. Interface sleeve 16 is formed to include an inner wall 44 that defines a closure-receiving space 45, an outer wall 46, and a top wall 48 as shown in FIG. 3. Inner wall 44 extends inside filler neck 12 along axis 15 and is formed to include catch receivers 22 that are engaged by catches 38 of closure 14. Outer wall 46 extends outside filler neck 12 along axis 15 and is formed to include crimp tabs 20. Top wall 48 interconnects inner wall 44 and outer wall 46 to define a downwardly opening channel 47 that receives a portion of filler neck 12.

Filler neck 12 is illustratively a blow-molded tube having a roughly 60 millimeter diameter and is adapted to be coupled to fuel tank 11 as suggested in FIG. 1. Filler neck 12 is formed to include tab receivers 50 and a seal groove 52 as shown in FIG. 2. Tab receivers 50 are spaced circumferentially around filler neck 12 and extend radially inward into filler neck 12. Tab receivers 50 receive crimp tabs 20 of interface sleeve 16 when they are deformed to couple interface sleeve 16 to filler neck 12.

An o-ring seal 60 included in fuel tank filler apparatus 10 seals between filler neck 12 and interface sleeve 16 as shown in FIG. 3. O-ring seal 60 is sized to be received in groove 52 formed in filler neck 12.

Inner wall 44 is shaped to push a portion of filler neck 12 into a round shape in a location where closure 14 is inserted into filler neck 12 as suggested in FIG. 3. As a result, inner wall 44 controls the roundness of filler neck 12 for sealing between closure 14 and filler neck 12 by seals 41, 42. Illustratively, inner wall 44 and closure 14 are rigid such that a gap formed between inner wall 44 and closure 14 is uniform around closure 14. As a result, seals 41, 42 may be selected to have a desired uniform size to properly seal the uniform gap formed between inner wall 44 and closure 14. Illustratively, pushing filler neck 12 into round causes a gap formed between outer wall 46 and filler neck 12 to be uniform around filler neck 12. As a result, seal 60 may be selected to have a desired uniform size to properly seal the uniform gap formed between outer wall 46 and filler neck 12.

Figure 4:
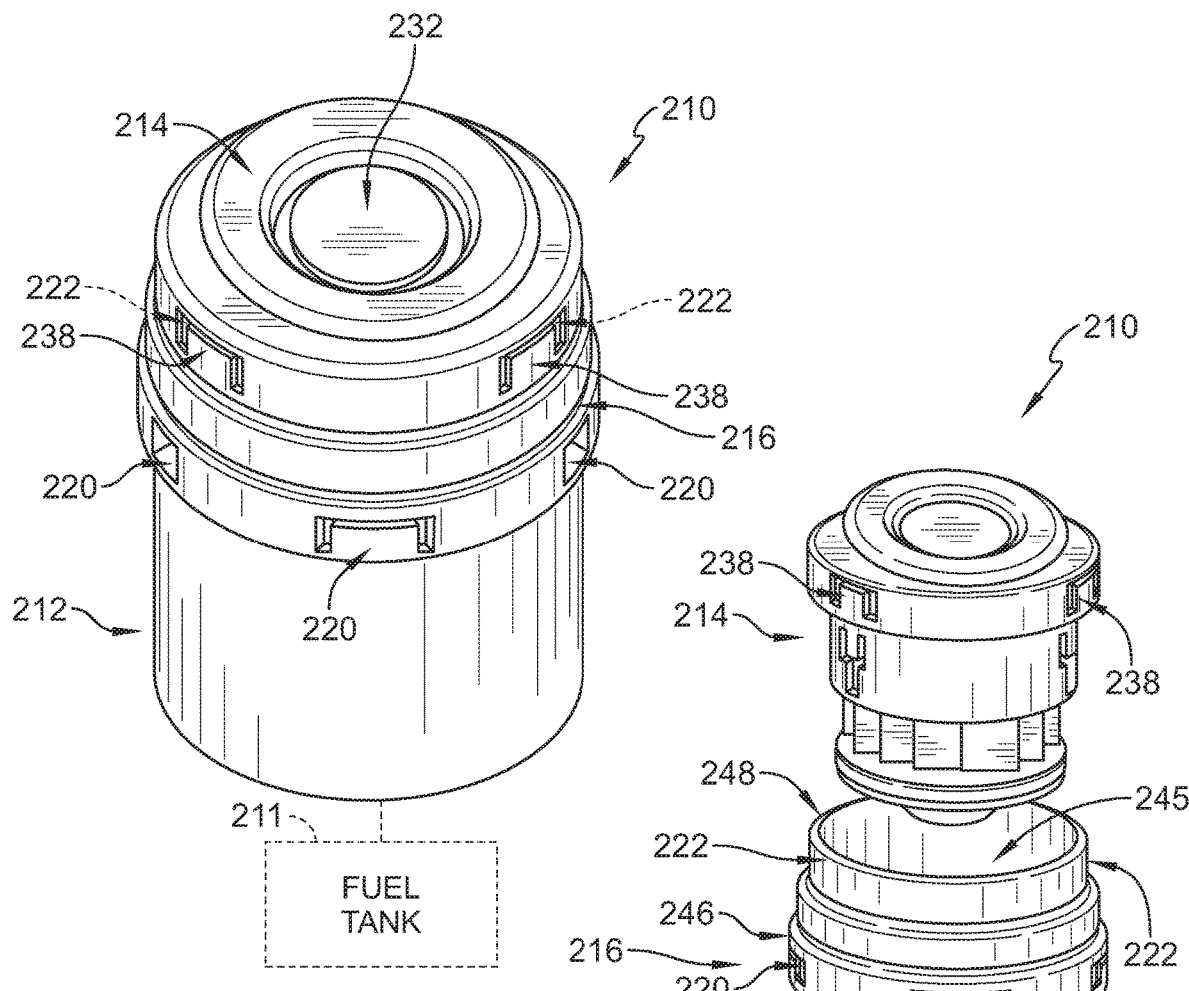
Figure 5:
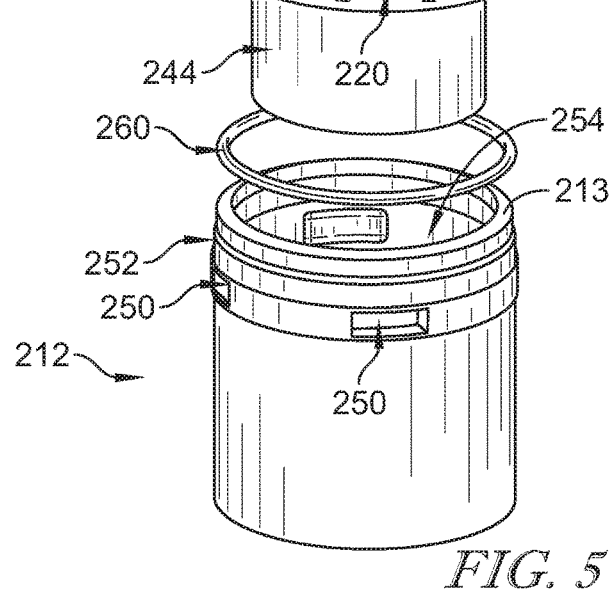
Figure 6:
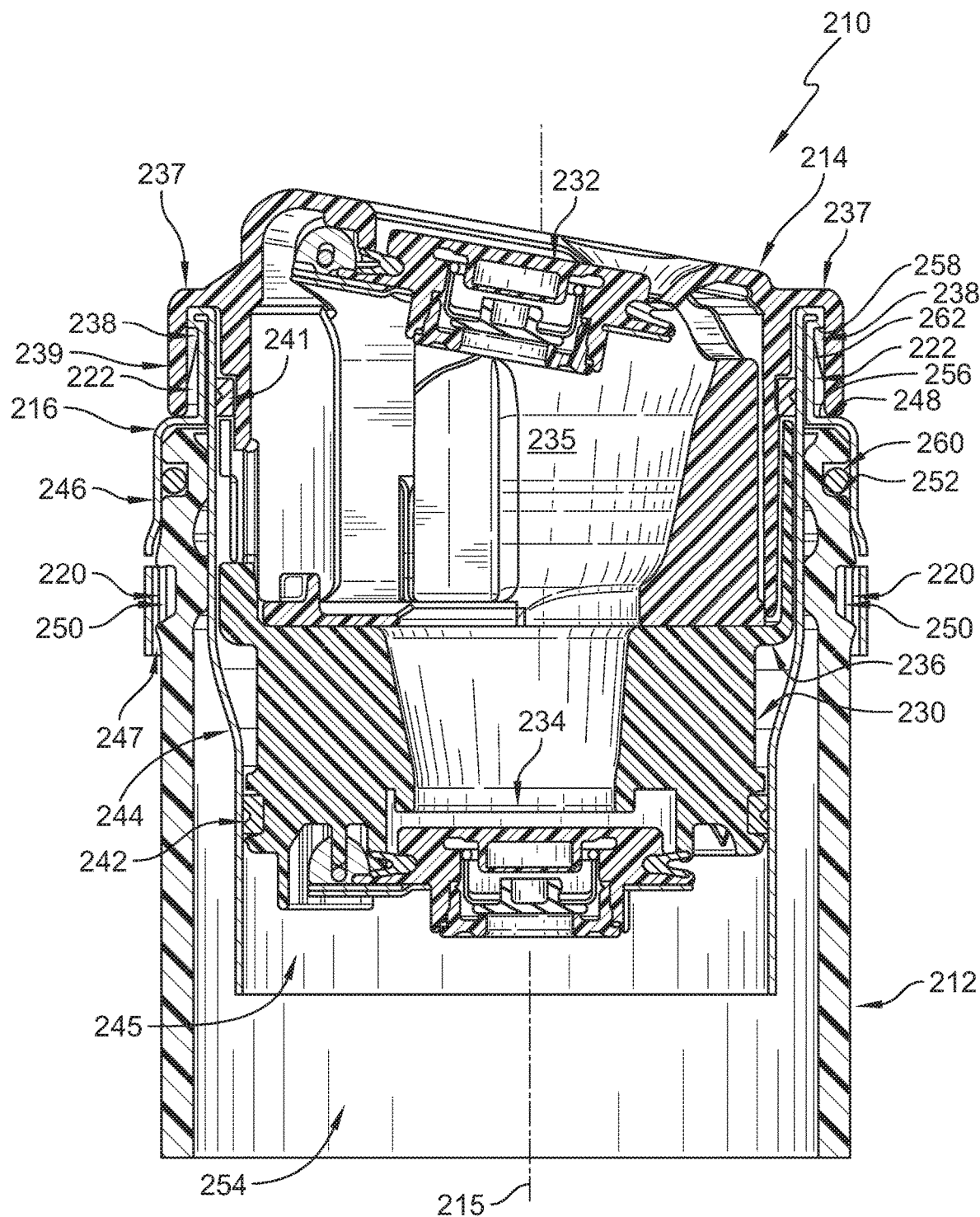

A second fuel tank filler apparatus 210 in accordance with the present disclosure includes a fuel-tank filler neck 212 associated with a fuel tank 211, a capless filler neck closure 214, and an interface sleeve 216 as shown in FIGS. 4-6. Interface sleeve 216 is adapted to couple closure 214 to filler neck 212 such that closure 214 is removable from filler neck 212 for service or replacement. Interface sleeve 216 includes crimp tabs 220 configured to engage filler neck 212 and a catch receivers 222 adapted to be engaged by catches 238 included in closure 214 in order to interconnect filler neck 212 and closure 214. Closure 214 is not welded permanently to filler neck 212 when coupled to filler neck 212 by interface sleeve 216 and is removable by service technicians for service.

Capless filler neck closure 214 is adapted to close filler neck 212 to block fuel and fuel vapor from escaping fuel tank 211 through filler neck 212 when fuel tank 211 is not being refueled as suggested in FIG. 4. Closure 214 illustratively includes a nozzle-insertion housing 230 that is sized to extend into fuel-tank filler neck 212, an outer dust cover 232 mounted to housing 230, and an inner closure door 234 mounted to housing 230. Nozzle-insertion housing 230 forms a nozzle-insertion passageway 235 sized to receive a fuel-dispensing nozzle that extends through passageway 235 into filler neck 212 during refueling. Outer dust cover 232 and inner closure door 234 are mounted to pivot relative housing 230 when a fuel-dispensing nozzle is inserted into closure 214 for refueling.

Nozzle-insertion housing 230 of capless filler neck closure 214 is illustratively formed from polymeric materials and may be a multi-component assembly as shown in FIG.

6. Housing 230 of the exemplary embodiment includes an outer side wall 236, a rim 237 that extends around outer side wall 236, and catches 238 that extend inward in a radial direction from rim 237 toward a central axis 215 of fuel tank filler apparatus 210. Seals 241, 242 are received in grooves formed in outer side wall 236 and engage interface sleeve 216 to seal between closure 214 and interface sleeve 216. Catches 238 engage catch receivers 222 of interface sleeve 216 to couple closure 214 to interface sleeve 216. Catches 238 are plastically deformable in some embodiments, in other embodiments, catches 238 are elastically deformable.

Interface sleeve 216 illustratively is a monolithic, one-piece component that comprises metallic materials (i.e. stainless steel) as suggested in FIGS. 4-6. Interface sleeve 216 is formed to include an inner wall 244 that defines a closure-receiving space 245, an outer wall 246, and a top wall 248 as shown in FIG. 6. Inner wall 244 extends inside filler neck 212 along axis 215. Outer wall 246 extends outside filler neck 212 along axis 215 and is formed to include crimp tabs 220. Top wall 248 interconnects inner wall 244 and outer wall 246 to define a downwardly opening channel 247 that receives a portion of filler neck 212. Top wall 248 is further formed to include catch receivers 222 that are engaged by catches 238 of closure 214.

Filler neck 212 is illustratively a blow-molded tube having a roughly 60 millimeter diameter and is adapted to be coupled to fuel tank 211 as suggested in FIG. 4. Filler neck 212 is formed to include tab receivers 250 and a seal groove 252 as shown in FIG. 5. Tab receivers 250 are spaced circumferentially around filler neck 212 and extend radially inward into filler neck 212. Tab receivers 250 receive crimp tabs 220 of interface sleeve 216 when they are deformed to couple interface sleeve 216 to filler neck 212.

An o-ring seal 260 included in fuel tank filler apparatus 210 seals between filler neck 212 and interface sleeve 216 as shown in FIG. 6. O-ring seal 260 is sized to be received in groove 252 formed in filler neck 212.

A third fuel tank filler apparatus 310 in accordance with the present disclosure includes a fuel-tank filler neck 212 associated with a fuel tank 211, a capless filler neck closure 214, and an interface sleeve 216 as shown in FIGS. 7-10. Fuel tank filler apparatus 310 is substantially similar to fuel tank filler apparatus 210 described above as suggested by similar reference numbers in the 200 series.

Fuel tank filler apparatus 310 is unlike fuel tank filler apparatus 210 in that fuel tank filler apparatus 310 includes a compression seal 370 arranged along a top surface 213 of filler neck 212 to seal between filler neck 212 and interface sleeve 216 as shown in FIGS. 8 and 10. Compressible seal 370 is illustratively arranged between top surface 213 of filler neck 212 and top wall 248 of interface sleeve 216.

In the illustrative embodiment, compressible seal 370 is annular and has an H-shaped cross section as shown in FIGS. 9 and 10. Compressible seal 370 may also be hollow.

In other embodiments, other compressible seals, like compressible seal 370' shown in FIG. 9A may be used in place of compressible seal 370 as suggested in FIGS. 9A and 10A. Compressible seal 370' is annular and has a C-shaped cross section as shown in FIGS. 9A and 10A.

A fourth fuel tank filler apparatus 410 in accordance with the present disclosure is shown in FIGS. 11-13. Fuel tank filler apparatus 410 is similar to fuel tank filler apparatus 210 but is reconfigured for inclusion of a 48 millimeter filler neck 412 rather than a 60 millimeter filler neck (i.e. filler neck 212).

Fuel tank filler apparatus 410 illustratively includes a fuel-tank filler neck 412 associated with a fuel tank 411, a capless filler neck closure 414, and an interface sleeve 416 as shown in FIGS. 11-13. Interface sleeve 416 is adapted to couple closure 414 to filler neck 412 such that closure 414 is removable from filler neck 412 for service or replacement. Interface sleeve 416 includes crimp tabs 420 configured to engage filler neck 412 and a catch receivers 422 adapted to be engaged by catches 438 included in closure 414 in order to interconnect filler neck 412 and closure 414. Closure 414 is not welded permanently to filler neck 412 when coupled to filler neck 412 by interface sleeve 416 and is removable by service technicians for service.

Capless filler neck closure 414 is adapted to close filler neck 412 to block fuel and fuel vapor from escaping fuel tank 411 through filler neck 412 when fuel tank 411 is not being refueled as suggested in FIG. 11. Closure 414 illustratively includes a nozzle-insertion housing 430 that is sized to extend into fuel-tank filler neck 412, an outer dust cover 432 mounted to housing 430, and an inner closure door 434 mounted to housing 430. Nozzle-insertion housing 430 forms a nozzle-insertion passageway 435 sized to receive a fuel-dispensing nozzle that extends through passageway 435 into filler neck 412 during refueling. Outer dust cover 432 and inner closure door 434 are mounted to pivot relative housing 430 when a fuel-dispensing nozzle is inserted into closure 414 for refueling.

Nozzle-insertion housing 430 of capless filler neck closure 414 is illustratively formed from polymeric materials and may be a multi-component assembly as shown in FIG. 13. Housing 430 of the exemplary embodiment includes an outer side wall 436, a rim 437 that extends around outer side wall 436, and catches 438 that extend inward in a radial direction from rim 437 toward a central axis 415 of fuel tank filler apparatus 410. Seals 441, 442 are received in grooves formed in outer side wall 436 and engage interface sleeve 416 to seal between closure 414 and interface sleeve 416. Catches 438 engage catch receivers 422 of interface sleeve 416 to couple closure 414 to interface sleeve 416. Catches 438 are plastically deformable in the illustrative embodiment.

Interface sleeve 416 illustratively is a monolithic, one-piece component that comprises metallic materials (i.e. stainless steel) as suggested in FIGS. 11-13. Interface sleeve 416 is formed to include an inner wall 444 that defines a closure-receiving space 445, an outer wall 446, and a top wall 448 as shown in FIG. 13. Inner wall 444 extends inside filler neck 412 along axis 415. Outer wall 446 extends outside filler neck 412 along axis 415 and is formed to include crimp tabs 420. Top wall 448 interconnects inner wall 444 and outer wall 446 to define a downwardly opening channel 447 that receives a portion of filler neck 412. Top wall 448 is further formed to include catch receivers 422 that are engaged by catches 438 of closure 414.

Filler neck 412 is illustratively a blow-molded tube having a roughly 48 millimeter diameter and is adapted to be coupled to fuel tank 411 as suggested in FIG. 11. Filler neck 412 is formed to include tab receivers 450 and a seal groove 452 as shown in FIG. 12. Tab receivers 450 are spaced circumferentially around filler neck 412 and extend radially inward into filler neck 412. Tab receivers 450 receive crimp tabs 420 of interface sleeve 416 when they are deformed to couple interface sleeve 416 to filler neck 412.

An o-ring seal 460 included in fuel tank filler apparatus 410 seals between filler neck 412 and interface sleeve 416 as shown in FIG. 13. O-ring seal 460 is sized to be received in groove 452 formed in filler neck 412.

A fifth fuel tank filler apparatus 510 in accordance with the present disclosure is shown in FIGS. 14-16. Fuel tank filler apparatus 510 is similar to fuel tank filler apparatus 410 including a 48 millimeter filler neck 512 rather than a 60 millimeter filler neck (i.e. filler neck 212). However, fuel tank filler apparatus 510 includes an interface sleeve 516 comprising polymeric materials (i.e. plastics) and having catches 521 rather than crimp tabs (i.e. crimp tabs 220).

Fuel tank filler apparatus 510 illustratively includes a fuel-tank filler neck 512 associated with a fuel tank 511, a capless filler neck closure 514, and interface sleeve 516 as shown in FIGS. 14-16. Interface sleeve 516 is adapted to couple closure 514 to filler neck 512 such that closure 514 is removable from filler neck 512 for service or replacement. Interface sleeve 516 includes catches 521 configured to engage filler neck 512 and a catch receivers 522 adapted to be engaged by catches 538 included in closure 514 in order to interconnect filler neck 512 and closure 514. Closure 514 is not welded permanently to filler neck 512 when coupled to filler neck 512 by interface sleeve 516 and is removable by service technicians for service.

Capless filler neck closure 514 is adapted to close filler neck 512 to block fuel and fuel vapor from escaping fuel tank 511 through filler neck 512 when fuel tank 511 is not being refueled as suggested in FIG. 11. Closure 514 illustratively includes a nozzle-insertion housing 530 that is sized to extend into fuel-tank filler neck 512, an outer dust cover 532 mounted to housing 530, and an inner closure door 534 mounted to housing 530. Nozzle-insertion housing 530 forms a nozzle-insertion passageway 535 sized to receive a fuel-dispensing nozzle that extends through passageway 535 into filler neck 512 during refueling. Outer dust cover 532 and inner closure door 534 are mounted to pivot relative housing 530 when a fuel-dispensing nozzle is inserted into closure 514 for refueling.

Nozzle-insertion housing 530 of capless filler neck closure 514 is illustratively formed from polymeric materials (i.e. plastics) and may be a multi-component assembly as shown in FIG. 16. Housing 530 of the exemplary embodiment includes an outer side wall 536, a rim 537 that extends around outer side wall 536, and catches 538 that extend inward in a radial direction from rim 537 toward a central axis 515 of fuel tank filler apparatus 510. Seals 541, 542 are received in grooves formed in outer side wall 536 and engage interface sleeve 516 to seal between closure 514 and interface sleeve 516. Catches 538 engage catch receivers 522 of interface sleeve 516 to couple closure 514 to interface sleeve 516. Catches 538 are plastically deformable in the illustrative embodiment.

Interface sleeve 516 illustratively is a monolithic, one-piece component that comprises polymeric materials (i.e. plastic such as polyamide 66) as suggested in FIGS. 14-16. Interface sleeve 516 is formed to include an inner wall 544 that defines a closure-receiving space 545, an outer wall 546, and a top wall 548 as shown in FIG. 13. Inner wall 544 extends inside filler neck 512 along axis 515. Outer wall 546 extends outside filler neck 512 along axis 515 and is formed to include catches 521. Catches 521 are deformable. Top wall 548 interconnects inner wall 544 and outer wall 546 to define a downwardly opening channel 547 that receives a portion of filler neck 512. Top wall 548 is further formed to include catch receivers 522 that are engaged by catches 538 of closure 514.

Filler neck 512 is illustratively a blow-molded tube having a roughly 48 millimeter diameter and is adapted to be coupled to fuel tank 511 as suggested in FIG. 14. Filler neck 512 is formed to include catch receivers 551 and a seal groove 552 as shown in FIG. 12. Catch receivers 551 are spaced circumferentially around filler neck 512 and extend radially inward into filler neck 512. Catch receivers 551 receive catches 521 of interface sleeve 516.

An o-ring seal 560 included in fuel tank filler apparatus 510 seals between filler neck 512 and interface sleeve 516 as shown in FIG. 13. O-ring seal 560 is sized to be received in groove 552 formed in filler neck 512.

Another fuel tank filler apparatus 610 in accordance with the present disclosure includes a fuel-tank filler neck 612 associated with a fuel tank 611, a capless filler neck closure 614, an interface sleeve 616, and a retainer ring 618 as shown in FIGS. 17-21. Interface sleeve 616 is shaped to push fuel-tank filler neck 612 into a round shape and, along with capless filler neck closure 614, seals fuel-tank filler neck 612 from atmosphere. Retainer ring 618 couples closure 614 to filler neck 612 such that closure 614 is removable from filler neck 612 for service or replacement. Retainer ring 618 includes crimp tabs 620 configured to engage filler neck 612 and cam tabs 622 that are received in cam slots 638 formed by closure 614 to couple retainer ring 618 to closure 614.

Closure 614 is not welded permanently to filler neck 612 when coupled to filler neck 612 by retainer ring 618 and is removable by service technicians for service. In one illustrative method of using designs of the present disclosure, a technician would uncramp crimp tabs 620 of retainer ring 618 such that crimp tabs 620 are disengaged from filler neck 612 before lifting closure 614 and interface sleeve 616 out of filler neck 612. The technician could then service closure 614 outside of filler neck 612. The technician may replace retainer ring 618 as part of servicing closure 614 or may reuse retainer ring 618. When service of closure 614 is complete, the technician could attach/reattach retainer ring 618 to closure 614, reinsert closure 614 and interface sleeve 616 into filler neck 612, and deform crimp tabs 620 to re-couple closure 614 to filler neck 12.

According to the present disclosure, capless filler neck closure 614 is adapted to close filler neck 612 to block fuel and fuel vapor from escaping fuel tank 611 through filler neck 612 when fuel tank 611 is not being refueled as suggested in FIG. 17. Closure 614 illustratively includes a nozzle-insertion housing 630 that is sized to extend into fuel-tank filler neck 612, an outer dust cover 632 mounted to housing 630, and an inner closure door 634 mounted to housing 630. Nozzle-insertion housing 630 forms a nozzle-insertion passageway 635 sized to receive a fuel-dispensing nozzle that extends through passageway 635 into filler neck 612 during refueling. Outer dust cover 632 and inner closure door 634 are mounted to pivot relative housing 630 when a fuel-dispensing nozzle is inserted into closure 614 for refueling.

Nozzle-insertion housing 630 of capless filler neck closure 614 is illustratively formed from polymeric materials and may be a multi-component assembly as shown in FIG. 19. Housing 630 of the exemplary embodiment includes an outer side wall 636. Seals 641, 642 are received in grooves formed in outer side wall 636 and engage interface sleeve 616 to seal between and couple via interference fit closure 614 and interface sleeve 616.

Interface sleeve 616 illustratively is a monolithic, one-piece component that comprises polymeric materials (i.e. plastics such as PA66 Zytel) as suggested in FIGS. 17-19. Interface sleeve 616 is formed to include an inner wall 644 that defines a closure-receiving space 645, an outer wall 646, and a top wall 648 as shown in FIG. 19. Inner wall 644 extends inside filler neck 612 along axis 615 of apparatus 610. Outer wall 646 extends outside filler neck 612 along axis 615. Top wall 648 interconnects inner wall 644 and outer wall 646 to define a downwardly opening channel 647 that receives an end portion of filler neck 612.

Retainer ring 618 is coupled to closure 614 and engages filler neck 612 to mount closure 614 (and interface sleeve 616) to filler neck 612 as shown in FIGS. 17 and 19. Retainer ring 618 includes an outer band 670, crimp tabs 620, a cap wall 672, and cam tabs 622. Outer band 670 extends around closure 614 and along axis 615 and is formed to include side slots 674 that receive guide pegs 675 included in filler neck 612 to orient and anti-rotate retainer ring 618 and closure 614 relative to filler neck 612. Crimp tabs 620 are configured to be bent out of alignment with outer band 670 into tab receivers 650 formed in filler neck 612 to couple retainer ring 618 and closure 614 to filler neck 612. Cap wall 672 extends radially inwardly from outer band 670 toward axis 615 over a portion of closure 614. Cam tabs 622 extend radially inwardly from cap wall 672 and are received in cam slots 638 formed by closure 614 to couple retainer ring 618 to closure 614. Retainer ring 618 illustratively comprises metallic materials (i.e. stainless steel 304L) but may be made from other suitable materials as well.

Filler neck 612 is illustratively a blow-molded tube having a roughly 648 millimeter diameter and is adapted to be coupled to fuel tank 611 as suggested in FIG. 17. Filler neck 612 is formed to include tab receivers 650 and a seal groove 652 as shown in FIG. 18. Tab receivers 650 are spaced circumferentially around filler neck 612 and extend radially inward into filler neck 612. Tab receivers 650 receive crimp tabs 620 of interface sleeve 616 when they are deformed to couple interface sleeve 616 to filler neck 612.

An o-ring seal 660 included in fuel tank filler apparatus 610 seals between filler neck 612 and interface sleeve 616 as shown in FIG. 19. O-ring seal 660 is sized to be received in groove 652 formed in filler neck 612.

Embodiments of the present disclosure provide a low permeation connection of capless unit/closure with blow molded multilayer plastic filler pipe/neck. The coupling of the capless unit and the plastic filler pipe is illustratively accomplished by: inserting the capless unit into a plastic sleeve creating an internal seal between these units; assembling a metal cover to this capless sub assembly with a cam-lock to provide ease of assembly and serviceability; assembling an (1) or (2) o-rings in o-ring groves on the outside diameter of the plastic filler pipe; inserting the entire capless sub-assembly with in an axial direction, where features on the metal ring are crimped into indentations on the outside diameter of the pipe to provide attachment.

The following numbered clauses include embodiments that are contemplated and non-limiting:

Clause 1. A fuel tank filler apparatus adapted for use in a vehicle fuel system, the fuel tank filler apparatus comprising a fuel-tank filler neck associated with a fuel tank, the fuel-tank filler neck that extends around a central axis of the fuel tank filler apparatus to define a fuel receiving passageway and the fuel-tank filler neck including an outer end having a top surface that defines a mouth that opens into the fuel receiving passageway, a capless filler neck closure adapted to be mated with the outer end of the fuel-tank filler neck to block fuel and fuel vapor from escaping the fuel-tank filler neck during use of the fuel tank filler apparatus, the capless filler neck closure including a nozzle-insertion housing that extends into the fuel-tank filler neck, an outer dust cover mounted to pivot relative to the nozzle-insertion housing from a closed position arranged to block dust from entering the nozzle-insertion passageway to an open position arranged to allow a fuel nozzle to enter the nozzle-insertion passageway, and an inner closure door spaced apart from the outer dust cover along the central axis and mounted to pivot relative to the nozzle-insertion housing from a closed position arranged to block fuel and fuel vapor from escaping the associated fuel tank and an open position arranged to allow a fuel nozzle to enter fuel receiving passageway, and interface means for pushing a portion of the blow-molded fuel-tank filler neck into a round shape in order to facilitate receipt of the capless filler neck closure in the blow-molded fuel-tank filler neck and for coupling the capless filler neck closure to the blow-molded fuel-tank filler neck without welds or permanent attachment to facilitate selective decoupling of the capless filler neck closure from the blow-molded fuel-tank filler neck thereby allowing non-destructive removal of the capless filler neck closure for replacement or repair of the capless filler neck closure.

Clause 2. A fuel tank filler apparatus adapted for use in a vehicle fuel system, the fuel tank filler apparatus comprising a fuel-tank filler neck that extends along a central axis of the fuel tank filler apparatus and the fuel-tank filler neck having a top surface that defines a mouth of the fuel-tank filler neck, a capless filler neck closure including a nozzle-insertion housing formed to define a nozzle-insertion passageway sized to receive a fuel nozzle, an outer dust cover mounted to pivot relative to the nozzle-insertion housing from a closed position arranged to block dust from entering the nozzle-insertion passageway to an open position arranged to allow a fuel nozzle to enter the nozzle-insertion passageway, an inner closure door mounted to pivot relative to the nozzle-insertion housing from a closed position arranged to block fuel and fuel vapor from escaping the fuel-tank filler neck and an open position arranged to allow a fuel nozzle to enter the fuel-tank filler neck, and a radially extending catch coupled to the nozzle-insertion housing, and an interface sleeve that extends into the mouth of the fuel-tank filler neck, the interface sleeve including an inner wall formed to define a closure-receiving space that receives the nozzle-insertion housing included in the capless filler neck closure, an outer wall spaced apart radially from the inner wall, a top wall interconnecting the inner wall and the outer wall to define a downwardly opening channel that receives the top surface of the fuel-tank filler neck, and a catch receiver that receives the catch included in the capless filler neck closure to couple the capless filler neck closure to the interface sleeve to block relative movement of the capless filler neck closure along the central axis relative to the interface sleeve.

Clause 3. A fuel tank filler apparatus adapted for use in a vehicle fuel system, the fuel tank filler apparatus comprising a fuel-tank filler neck that extends around a central axis of the fuel tank filler apparatus to define a fuel-receiving passageway and the fuel-tank filler neck includes a top surface arranged to define a mouth that opens into the fuel-receiving passageway and a tab receiver that extends radially into the fuel-tank filler neck toward the central axis, a capless filler neck closure including a nozzle-insertion housing formed to define a nozzle-insertion passageway and a cam slot that extends radially inwardly into the nozzle-insertion housing, an outer dust cover mounted to pivot relative to the nozzle-insertion housing from a closed position arranged to block dust from entering the nozzle-insertion passageway to an open position arranged to allow a fuel nozzle to enter the nozzle-insertion passageway, and an inner closure door mounted to pivot relative to the nozzle-insertion housing from a closed position arranged to block fuel and fuel vapor from escaping the fuel-receiving passageway and an open position arranged to allow a fuel nozzle to enter the fuel-receiving passageway, and a retainer ring configured to couple the capless filler neck closure to the fuel-tank filler neck to block relative movement of the capless filler neck closure along the central axis relative to the fuel-tank filler neck, the retainer ring including an outer band that extends circumferentially around the fuel-tank filler neck, a cap wall that extends radially inwardly away from the outer band toward the central axis into the cam slot formed in the capless filler neck closure to couple the retainer ring to the capless filler neck closure, and a crimp tab configured to extend into the tab receiver included in the fuel-tank filler neck to couple the retainer ring to the fuel-tank filler neck.

Clause 4. The fuel tank filler apparatus of any other suitable clause, wherein the interface means includes an interface sleeve including an inner wall that defines a closure-receiving space that receives the nozzle-insertion housing of the capless filler neck closure and an outer wall that is spaced apart radially from the inner wall, the capless filler neck closure includes a deformable catch that extends radially outwardly away from the nozzle-insertion housing toward the inner wall of the interface sleeve, the inner wall of the interface sleeve is formed to include a catch receiver that receives the deformable catch to couple the capless filler neck closure to the interface sleeve, and the outer wall is formed to include a crimp tab that engages the fuel-tank filler neck to couple the interface sleeve to the fuel-tank filler neck.

Clause 5. The fuel tank filler apparatus of any other suitable clause, wherein the interface means includes an interface sleeve including an inner wall that defines a closure-receiving space that receives the nozzle-insertion housing of the capless filler neck closure, an outer wall that is spaced apart radially from the inner wall, and a top wall that interconnects the inner wall and the outer wall, the capless filler neck closure includes a deformable catch that extends radially inwardly toward the central axis, and the top wall of the interface sleeve is formed to include a catch receiver that receives the deformable catch to couple the capless filler neck closure to the interface sleeve.

Clause 6. The fuel tank filler apparatus of any other suitable clause, wherein the outer wall of the interface sleeve is formed to include a crimp tab and the fuel-tank filler neck is formed to include a tab receiver and the crimp tab is that extends into the tab receiver to couple the interface sleeve to the fuel-tank filler neck.

Clause 7. The fuel tank filler apparatus of any other suitable clause, wherein the interface means includes a retainer ring that couples the capless filler neck closure to the fuel-tank filler neck, the capless filler neck closure is formed to include a cam slot that extends radially inwardly toward the central axis and away from the retainer ring, and the retainer ring includes an outer band that extends circumferentially around the fuel-tank filler neck, a cap wall that extends radially inwardly away from the outer band into the cam slot formed in the capless filler neck closure to couple the retainer ring to the capless filler neck closure, and a crimp tab configured to engage the fuel-tank filler neck to couple the retainer ring to the fuel-tank filler neck.

Clause 8. The fuel tank filler apparatus of any other suitable clause, wherein the interface means further includes an interface sleeve including an inner wall formed to define a closure-receiving space that receives the nozzle-insertion housing, an outer wall spaced apart radially from the inner wall, and a top wall that interconnects the inner wall and the outer wall to define a downwardly opening channel that receives the top surface of the fuel-tank filler neck and the top wall located axially between the cap wall of the retainer ring and the top surface of the fuel-tank filler neck.

Clause 9. The fuel tank filler apparatus of any other suitable clause, wherein the outer wall of the interface sleeve is formed to include a deformable crimp tab and the fuel-tank filler neck is formed to define a tab receiver that receives the deformable crimp tab to couple the interface sleeve to the fuel-tank filler neck and block relative axial movement between the interface sleeve and the fuel-tank filler neck.

Clause 10. The fuel tank filler apparatus of any other suitable clause, wherein the catch included in the capless filler neck closure is coupled to and extends radially outward away from the nozzle-insertion housing toward the inner wall of the interface sleeve and the inner wall of the interface sleeve is formed to include the catch receiver.

Clause 11. The fuel tank filler apparatus of any other suitable clause, wherein the nozzle-insertion housing further includes a first seal configured to engage the nozzle-insertion housing and the inner wall of the interface sleeve and a second seal configured to engage the nozzle-insertion housing and the inner wall of the interface sleeve and the first seal is spaced apart axially from the catch to locate the second seal therebetween.

Clause 12. The fuel tank filler apparatus of any other suitable clause, wherein the outer wall of the interface sleeve is formed to include a deformable crimp tab and the fuel-tank filler neck is formed to define a tab receiver that receives the deformable crimp tab to couple the interface sleeve to the fuel-tank filler neck and block relative axial movement between the interface sleeve and the fuel-tank filler neck.

Clause 13. The fuel tank filler apparatus of any other suitable clause, wherein the nozzle-insertion housing includes an outer side wall and a rim that extends radially outward away from the outer side wall, the catch is coupled to the rim and extends radially inward toward the central axis, and the top wall of the interface sleeve is formed to include the catch receiver.

Clause 14. The fuel tank filler apparatus of any other suitable clause, wherein the top wall included in the interface sleeve includes an upwardly facing surface, a downwardly facing surface spaced apart axially from the upwardly facing surface, and a radially outwardly facing surface interconnecting the upwardly facing surface and the downwardly facing surface to define the catch receiver.

Clause 15. The fuel tank filler apparatus of any other suitable clause, wherein the outer wall of the interface sleeve is formed to include a deformable crimp tab and the fuel-tank filler neck is formed to define a tab receiver that receives the deformable crimp tab to couple the interface sleeve to the fuel-tank filler neck and block relative axial movement between the interface sleeve and the fuel-tank filler neck.

Clause 16. The fuel tank filler apparatus of any other suitable clause, wherein the fuel tank filler apparatus further includes a compression seal arranged along the top surface of the fuel-tank filler neck to provide a seal between the fuel-tank filler neck and the interface sleeve.

Clause 17. The fuel tank filler apparatus of any other suitable clause, wherein the compression seal is annular and has one of an H-shaped cross section and a C-shaped cross section.

Clause 18. The fuel tank filler apparatus of any other suitable clause, wherein the nozzle-insertion housing includes an outer side wall and a rim that extends radially outwardly away from the outer side wall and the cap wall included in the retainer ring is spaced apart axially from the top surface of the fuel-tank filler neck to locate the rim included in the nozzle-insertion housing between the cap wall and the top surface of the fuel-tank filler neck.

Clause 19. The fuel tank filler apparatus of any other suitable clause, wherein the fuel tank filler apparatus further comprises an interface sleeve that extends through the mouth and into the fuel-tank filler neck to push the fuel-tank filler neck into a round shape, the interface sleeve including an inner wall formed to define a closure-receiving space that receives the nozzle-insertion housing included in the capless filler neck closure, an outer wall spaced apart radially from the inner wall, and a top wall interconnecting the inner wall and the outer wall to define a downwardly opening channel that receives the top surface of the fuel-tank filler neck.

Clause 20. The fuel tank filler apparatus of any other suitable clause, wherein the fuel-tank filler neck includes a radially inwardly extending groove and a first seal located in the groove and engaged with the interface sleeve and the fuel-tank filler neck and the nozzle-insertion housing includes a second seal engaged with the nozzle-insertion housing and the interface sleeve.

As shown in FIGS. 1-3, fuel tank filler apparatus 10 includes fuel-tank filler neck 12 associated with fuel tank 11, capless filler neck closure 14, and interface means 16 for coupling capless filler neck closure 14 to fuel-tank filler neck 12 without welds or permanent attachment to block relative axial movement between capless filler neck closure 14 and fuel-tank filler neck 12 and for blocking fuel and fuel vapor from escaping between capless filler neck closure 14 and fuel-tank filler neck 12 during use of fuel tank filler apparatus 10 while allowing capless filler neck closure 14 to be removable selectively from fuel-tank filler neck 12 for service and replacement. Illustratively, interface means 16 includes interface sleeve 16.

In the illustrative embodiment, fuel-tank filler neck 12 comprises plastic material. Interface sleeve 16 comprises metallic material and extends into fuel-tank filler neck 12 to push fuel-tank filler neck 12 into a round shape. As such, fuel-tank filler neck 12 may be formed by a blow molding process which is relatively inexpensive as compared to other filler necks such as, for example, filler necks comprising metallic material. Interface sleeve 16 is rigid compared to fuel-tank filler neck 12 and relatively inexpensive to manufacture. As a result, interface sleeve 16 may be used to push fuel-tank filler neck 12 into a round shape and couple capless filler neck closure 14 to fuel-tank filler neck 12 while being sacrificial to allow capless filler neck closure 14 to be separated from fuel-tank filler neck 12 and interface sleeve 16 for repair and/or replacement.

Fuel-tank filler neck 12 is arranged to extend around central axis 15 of fuel tank filler apparatus 10 to define a fuel receiving passageway 54 as shown in FIG. 2. Fuel-tank filler neck 12 includes an outer end having a top surface 13 arranged to define a mouth that opens into fuel receiving passageway 54. Filler neck 12 is illustratively a blow-molded tube having a roughly sixty millimeter diameter and is adapted to be coupled to fuel tank 11 as suggested in FIG. 1. Filler neck 12 is formed to include tab receivers 50 and a seal groove 52 as shown in FIG. 2. Tab receivers 50 are spaced circumferentially around filler neck 12 and extend radially inward into filler neck 12. Tab receivers 50 receive crimp tabs 20 of interface sleeve 16 when they are deformed to couple interface sleeve 16 to filler neck 12. Illustratively, tab receivers 50 extend radially inward toward central axis 15 into filler neck 12 to form one or more indentations into filler neck 12.

An o-ring seal 60 included in fuel-tank filler neck apparatus 10 seals between filler neck 12 and interface sleeve 16 as shown in FIG. 3. O-ring seal 60 is sized to be received in groove 52 formed in filler neck 12. Seal 60 is located axially between top surface 13 and tab receivers 50.

Capless filler neck closure 14 is adapted to extend into and be mated with the outer end of fuel-tank filler neck 12 to block fuel and fuel vapor from escaping fuel-tank filler neck 12 during use of fuel tank filler apparatus 10. Capless filler neck closure 14 includes nozzle-insertion housing 30 arranged to extend into fuel receiving passageway 54 of fuel-tank filler neck 12, outer dust cover 32 pivotably mounted to nozzle-insertion housing 30, and inner closure door 34 spaced apart axially from outer dust cover 32 and pivotably mounted to nozzle-insertion housing 30. Illustratively, outer dust cover 32 is angled relative to central axis 15.

Nozzle-insertion housing 30 includes an outer side wall 36, a rim 37, and one or more catches 38 as shown in FIGS. 2 and 3. Outer side wall 36 is arranged around central axis 15 to define nozzle-insertion passageway 35. Rim 37 extends radially outward away from outer side wall 36 toward interface sleeve 16. As shown in FIG. 3, rim 37 engages top wall 48 of interface sleeve 16 to block access into closure-receiving space 45. One or more catches 38 are spaced axially apart from rim 37 and extend radially outward away from outer side wall 36 into one or more catch receivers 22, respectively, formed in interface sleeve 16. One or more catches 38 are deformable and form one or more flanges that may be elastically deformed radially inward in response to nozzle-insertion housing 30 being inserted into closure-receiving space 45. Catches 38 move toward their non-deformed state and extend into catch receivers 22 in response to nozzle-insertion housing 30 being assembled with interface sleeve 16 in its proper position.

Nozzle-insertion housing 30 of capless filler neck closure 14 is illustratively formed from polymeric materials and may be a multi-component assembly as shown in FIG. 3. Seals 41, 42 are received in grooves formed in outer side wall 36 and engage interface sleeve 16 to seal between closure 14 and interface sleeve 16. Seal 41 is located below and engages catch 38. Seal 42 is spaced apart axially from catch 38 to locate axially seal 41 therebetween. Catches 38 engage catch receivers 22 of interface sleeve 16 to couple closure 14 to interface sleeve 16. Catches 38 are deformable and are angled to bend during insertion of closure 14 into interface sleeve 16.

Interface sleeve 16 is adapted to couple closure 14 to filler neck 12 such that closure 14 is removable from filler neck 12 for service or replacement. Interface sleeve 16 illustratively is a monolithic, one-piece component that comprises metallic materials (i.e. stainless steel) as suggested in FIGS. 1-3.

Interface sleeve 16 includes inner wall 44 that defines closure-receiving space 45 adapted to receive nozzle-insertion housing 30 and outer wall 46 that is spaced apart radially from inner wall 44 as shown in FIG. 3. Inner wall 44 is formed to include one or more catch receivers 22 adapted to receive deformable catch 38 to couple capless filler neck closure 14 to interface sleeve 16. Catch receiver 22 extends radially outward away from central axis 15 into interface sleeve 16 to form an indention into interface sleeve 16. Outer wall 46 is formed to include one or more crimp tab 20 adapted to extend into a tab receiver 50 and engage fuel-tank filler neck 12 to couple interface sleeve 16 to fuel-tank filler neck 12. Crimp tabs 20 are configured to be plastically deformed radially inward into tab receivers 50. To separate interface sleeve 16 from fuel-tank filler neck 12, crimp tabs 20 are plastically deformed radially outward away from and out of tab receivers 50. Crimp tabs 20 may be plastically deformed radially inward or outward using a tool such as, for example, pliers, clamps, screwdrivers, etc.

Interface sleeve 16 further includes top wall 48 which interconnects inner wall 44 and outer wall 46 to define a downwardly opening channel 47 that receives outer end of filler neck 12. Top wall 48 is located axially between and illustratively engaged with rim 37 and top surface 13.

Closure 14 is not welded permanently to filler neck 12 when coupled to filler neck 12 by interface sleeve 16 and is removable by service technicians for service. In one illustrative method of using designs of the present disclosure, a technician would uncramp crimp tabs 20 of interface sleeve 16 such that crimp tabs 20 are disengaged from filler neck 12 before lifting closure 14 and interface sleeve 16 out of filler neck 12. The technician could then service closure 14 outside of filler neck 12. The technician may replace interface sleeve 16 as part of servicing closure 14 or may leave interface sleeve 16 in place during service. When service of closure 14 is complete, the technician could reinsert closure 14 and interface sleeve 16 into filler neck 12 and deform crimp tabs 20 to re-couple closure 14 to filler neck 12.

As shown in FIGS. 4-10A, fuel tank filler apparatuses 210, 310 include fuel-tank filler neck 212 associated with fuel tank 211, capless filler neck closure 214, and interface means 216 for coupling capless filler neck closure 214 to fuel-tank filler neck 212 without welds or permanent attachment to block relative axial movement between capless filler neck closure 214 and fuel-tank filler neck 212 and for blocking fuel and fuel vapor from escaping between capless filler neck closure 214 and fuel-tank filler neck 212 during use of fuel tank filler apparatus 210 while allowing capless filler neck closure 214 to be removable selectively from fuel-tank filler neck 212 for service and replacement. Illustratively, interface means 216 includes interface sleeve 216.

Capless filler neck closure 214 of fuel tank filler apparatus 210 includes nozzle-insertion housing 230, outer dust cover 232, and inner closure door 234 as shown in FIGS. 6 and 10. Nozzle-insertion housing 230 includes outer side wall 236, rim 237 that extends radially outward away from outer side wall 236, an outer band 239 that is radially spaced apart from outer side wall 236 and that is arranged to extend axially downwardly away from rim 237, and catches 238 that extend radially inwardly away from outer band 239 toward central axis 15 and into catch receivers 222 formed in interface sleeve 216. Rim 237 is arranged to contact a first portion of top wall 248 of interface sleeve 216 to block access into nozzle-insertion passageway 235. Outer band 239 extends around interface sleeve 216 and extends toward a second portion of top wall 248 as shown in FIG. 6. Outer band 239 and catches 238 are configured to deformed elastically.

Interface sleeve 216 is adapted to couple closure 214 to filler neck 212 such that closure 214 is removable from filler neck 212 for service or replacement as suggested in FIGS. 6 and 10. Interface sleeve 216 illustratively is a monolithic, one-piece component that comprises metallic materials (i.e. stainless steel). Interface sleeve 216 includes inner wall 244 that defines closure-receiving space 245 adapted to receive nozzle-insertion housing 230, outer wall 246 that is spaced apart radially from inner wall 244, and top wall 248 as shown in FIG. 6. Top wall 248 interconnects inner wall 244 and outer wall 246.

Top wall 248 is formed to include one or more catch receivers 222 adapted to receive deformable catches 238 to couple capless filler neck closure 214 to interface sleeve 216. Top wall 248 includes an upwardly facing surface 256, a downwardly facing surface 258 spaced apart axially from upwardly facing surface 256, and a radially outwardly facing surface 262 interconnecting upwardly facing surface 256 and downwardly facing surface 258 to define catch receivers 222. In the illustrative embodiment, surfaces 256, 258, 262 extend around central axis 215 to form an annular catch receiver 222 configured to receive one or more catches 238.

As suggested in FIG. 6, illustrative embodiments of interface sleeve 216 are formed from a single piece of sheet metal that is shaped to provide inner wall 244, outer wall 246, and top wall 248. The sheet metal is folded over itself to form top wall 248.

As shown in FIGS. 7-10A, fuel tank filler apparatus 310 includes a compressible seal 370. Compressible seal 370 is located axially between fuel-tank filler neck 212 and top wall 248 of interface sleeve 216.

As shown in FIGS. 11-13, fuel tank filler apparatus 410 includes fuel-tank filler neck 412 associated with fuel tank 411, capless filler neck closure 414, and interface means 416 for coupling capless filler neck closure 414 to fuel-tank filler neck 412 without welds or permanent attachment to block relative axial movement between capless filler neck closure 414 and fuel-tank filler neck 412 and for blocking fuel and fuel vapor from escaping between capless filler neck closure 414 and fuel-tank filler neck 412 during use of fuel tank filler apparatus 410 while allowing capless filler neck closure 414 to be removable selectively from fuel-tank filler neck 412 for service and replacement. Illustratively, interface means 416 includes interface sleeve 416.

Capless filler neck closure 414 is formed with a planar outer end as shown in FIG. 13. As such, rim 437 defines an upper most portion of capless filler neck closure 414. Outer dust cover 432 and inner closure door 434 extend generally perpendicular to central axis 415.

As shown in FIGS. 14-16, fuel tank filler apparatus 510 includes fuel-tank filler neck 512 associated with fuel tank 511, capless filler neck closure 514, and interface means 516 for coupling capless filler neck closure 514 to fuel-tank filler neck 512 without welds or permanent attachment to block relative axial movement between capless filler neck closure 514 and fuel-tank filler neck 512 and for blocking fuel and fuel vapor from escaping between capless filler neck closure 514 and fuel-tank filler neck 512 during use of fuel tank filler apparatus 510 while allowing capless filler neck closure 514 to be removable selectively from fuel-tank filler neck 512 for service and replacement. Illustratively, interface means 516 includes interface sleeve 516.

Capless filler neck closure 514 is formed with a planar outer end as shown in FIG. 16. As such, rim 537 defines an upper most portion of capless filler neck closure 514. Outer dust cover 532 and inner closure door 534 extend generally perpendicular to central axis 515. Interface sleeve 516 illustratively comprises plastic material as suggested in FIG. 16.

As shown in FIGS. 17-21, fuel tank filler apparatus 610 includes fuel-tank filler neck 612 associated with fuel tank 611, capless filler neck closure 614, and interface means for coupling capless filler neck closure 614 to fuel-tank filler neck 612 without welds or permanent attachment to block relative axial movement between capless filler neck closure 614 and fuel-tank filler neck 612 and for blocking fuel and fuel vapor from escaping between capless filler neck closure 614 and fuel-tank filler neck 612 during use of fuel tank filler apparatus 610 while allowing capless filler neck closure 614 to be removable selectively from fuel-tank filler neck 612 for service and replacement. Illustratively, interface means includes retainer ring 618 and interface sleeve 616.

Retainer ring 618 includes an outer band 670, a cap wall 672, and one orm ore crimp tabs 620. Outer band 670 is arranged to extend circumferentially around fuel-tank filler neck 612. Cap wall 672 extends radially inwardly away from outer band 670 toward central axis 615 into cam slot 638 formed in capless filler neck closure 614 to couple retainer ring 618 to capless filler neck closure 614. Crimp tab 620 is configured to extend into tab receiver 650 included in fuel-tank filler neck 612 to couple retainer ring 618 to fuel-tank filler neck 612. In some embodiments, retainer ring 618 further includes one or more cam tabs 622 that extend radially inwardly from cap wall 672 and cam tabs 622 extend into cam slot 638.

The invention claimed is:

1. A fuel tank filler apparatus adapted for use in a vehicle fuel system, the fuel tank filler apparatus comprising
a blow-molded fuel-tank filler neck associated with a fuel tank, the blow-molded fuel-tank filler neck shaped to extend around a central axis of the fuel tank filler apparatus to define a fuel receiving passageway and the blow-molded fuel-tank filler neck including an outer end having a top surface that defines a mouth that opens into the fuel receiving passageway,
a capless filler neck closure adapted to be mated with the outer end of the blow-molded fuel-tank filler neck to block fuel and fuel vapor from escaping the blow-molded fuel-tank filler neck during use of the fuel tank filler apparatus, the capless filler neck closure including a nozzle-insertion housing that extends into the blow-molded fuel-tank filler neck, an outer dust cover mounted to pivot relative to the nozzle-insertion housing from a closed position arranged to block dust from entering the nozzle-insertion passageway to an open position arranged to allow a fuel nozzle to enter the nozzle-insertion passageway, and an inner closure door spaced apart from the outer dust cover along the central axis and mounted to pivot relative to the nozzle-insertion housing from a closed position arranged to block fuel and fuel vapor from escaping the associated fuel tank and an open position arranged to allow a fuel nozzle to enter fuel receiving passageway, and
interface means for pushing a portion of the blow-molded fuel-tank filler neck into a round shape in order to facilitate receipt of the capless filler neck closure in the blow-molded fuel-tank filler neck and for coupling the capless filler neck closure to the blow-molded fuel-tank filler neck without welds or permanent attachment to facilitate selective decoupling of the capless filler neck closure from the blow-molded fuel-tank filler neck thereby allowing non-destructive removal of the capless filler neck closure for replacement or repair of the capless filler neck closure, wherein the interface means includes a retainer ring that couples the capless filler neck closure to the blow-molded fuel-tank filler neck, the capless filler neck closure is formed to include a cam slot that extends radially inwardly toward the central axis and away from the retainer ring, and the retainer ring includes an outer band that extends circumferentially around the blow-molded fuel-tank filler neck, a cap wall that extends radially inwardly away from the outer band into the cam slot formed in the capless filler neck closure to couple the retainer ring to the capless filler neck closure, and a crimp tab configured to engage the blow-molded fuel-tank filler neck to couple the retainer ring to the blow-molded fuel-tank filler neck.

2. The fuel tank filler apparatus of claim 1, wherein the interface means further includes an interface sleeve including an inner wall formed to define a closure-receiving space that receives the nozzle-insertion housing, an outer wall spaced apart radially from the inner wall, and a top wall that interconnects the inner wall and the outer wall to define a downwardly opening channel that receives the top surface of the blow-molded fuel-tank filler neck and the top wall located axially between the cap wall of the retainer ring and the top surface of the blow-molded fuel-tank filler neck.

3. A fuel tank filler apparatus adapted for use in a vehicle fuel system, the fuel tank filler apparatus comprising
a blow-molded fuel-tank filler neck that extends around a central axis of the fuel tank filler apparatus to define a fuel-receiving passageway and the blow-molded fuel-tank filler neck includes a top surface arranged to define a mouth that opens into the fuel-receiving passageway and a tab receiver that extends radially into the blow-molded fuel-tank filler neck toward the central axis,
a capless filler neck closure including a nozzle-insertion housing formed to define a nozzle-insertion passageway and a cam slot that extends radially inwardly into the nozzle-insertion housing, an outer dust cover mounted to pivot relative to the nozzle-insertion housing from a closed position arranged to block dust from entering the nozzle-insertion passageway to an open position arranged to allow a fuel nozzle to enter the nozzle-insertion passageway, and an inner closure door mounted to pivot relative to the nozzle-insertion housing from a closed position arranged to block fuel and fuel vapor from escaping the fuel-receiving passageway and an open position arranged to allow the fuel nozzle to enter the fuel-receiving passageway, and
a retainer ring configured to couple the capless filler neck closure to the blow-molded fuel-tank filler neck to block relative movement of the capless filler neck closure along the central axis relative to the blow-molded fuel-tank filler neck, the retainer ring including an outer band that extends circumferentially around the blow-molded fuel-tank filler neck, a cap wall that extends radially inwardly away from the outer band toward the central axis into the cam slot formed in the capless filler neck closure to couple the retainer ring to the capless filler neck closure, and a crimp tab configured to extend into the tab receiver included in the blow-molded fuel-tank filler neck to couple the retainer ring to the blow-molded fuel-tank filler neck.

4. The fuel tank filler apparatus of claim 3, wherein the nozzle-insertion housing includes an outer side wall and a rim that extends radially outwardly away from the outer side wall and the cap wall included in the retainer ring is spaced apart axially from the top surface of the blow-molded fuel-tank filler neck to locate the rim included in the nozzle-insertion housing between the cap wall and the top surface of the blow-molded fuel-tank filler neck.

5. The fuel tank filler apparatus of claim 3, further comprising an interface sleeve that extends through the mouth and into the blow-molded fuel-tank filler neck to push the blow-molded fuel-tank filler neck into a round shape, the interface sleeve including an inner wall formed to define a closure-receiving space that receives the nozzle-insertion housing included in the capless filler neck closure, an outer wall spaced apart radially from the inner wall, and a top wall interconnecting the inner wall and the outer wall to define a downwardly opening channel that receives the top surface of the blow-molded fuel-tank filler neck.

6. The fuel tank filler apparatus of claim 5, wherein the blow-molded fuel-tank filler neck includes a radially inwardly extending groove and a first seal located in the groove and engaged with the interface sleeve and the blow-molded fuel-tank filler neck and the nozzle-insertion housing includes a second seal engaged with the nozzle-insertion housing and the interface sleeve.

\* \* \* \* \*